(12) United States Patent
Tang et al.

(10) Patent No.: US 11,924,555 B2
(45) Date of Patent: Mar. 5, 2024

(54) INTELLIGENT AUTO-EXPOSURE CONTROL FOR RGB-IR SENSOR

(71) Applicant: Ambarella International LP, Santa Clara, CA (US)

(72) Inventors: Jian Tang, Shanghai (CN); Tao Liu, Shanghai (CN); Jingyang Qiu, Shanghai (CN)

(73) Assignee: Ambarella International LP, Santa Clara, CA (US)

( * ) Notice: Subject to any disclaimer, the term of this patent is extended or adjusted under 35 U.S.C. 154(b) by 0 days.

(21) Appl. No.: 17/834,327

(22) Filed: Jun. 7, 2022

(65) Prior Publication Data

US 2023/0328386 A1 Oct. 12, 2023

(30) Foreign Application Priority Data

Apr. 7, 2022 (CN) .......................... 202210373846.4

(51) Int. Cl.
*H04N 23/72* (2023.01)
*H04N 23/10* (2023.01)
*H04N 23/56* (2023.01)

(52) U.S. Cl.
CPC ............. *H04N 23/72* (2023.01); *H04N 23/10* (2023.01); *H04N 23/56* (2023.01)

(58) Field of Classification Search
CPC ......... H04N 23/72; H04N 23/10; H04N 23/56
USPC ....................................................... 348/164
See application file for complete search history.

(56) References Cited

U.S. PATENT DOCUMENTS

| | | | |
|---|---|---|---|
| 2008/0029714 A1* | 2/2008 | Olsen ................ | H01L 27/14634 257/E31.127 |
| 2018/0176487 A1* | 6/2018 | Price ....................... | H04N 23/11 |
| 2018/0295336 A1* | 10/2018 | Chen ..................... | H04N 13/254 |
| 2018/0336664 A1* | 11/2018 | Ono ........................ | H04N 25/63 |
| 2020/0112662 A1* | 4/2020 | Sakamoto ............ | H04N 25/131 |
| 2021/0044763 A1* | 2/2021 | Sun ..................... | H04N 9/04553 |
| 2021/0314501 A1* | 10/2021 | Chen ....................... | H04N 23/11 |
| 2022/0336508 A1* | 10/2022 | Tang ..................... | H04N 25/534 |
| 2022/0392182 A1* | 12/2022 | Tu .............................. | G06T 5/50 |
| 2023/0005240 A1* | 1/2023 | Chen ..................... | H04N 25/135 |
| 2023/0086743 A1* | 3/2023 | Yang ........................ | H04N 9/01 348/207.99 |

* cited by examiner

*Primary Examiner* — James T Boylan
(74) *Attorney, Agent, or Firm* — Christopher P. Maiorana, PC

(57) ABSTRACT

An apparatus comprising a light projector, a sensor and a processor. The light projector may be configured to toggle a light pattern. The sensor may be configured to generate pixel data. The processor may be configured to process the pixel data arranged as video frames, extract IR images with the light pattern, IR images without the light pattern and RGB images from the video frames, generate a control signal in response to the IR images with the light pattern and the RGB images, calculate an IR interference measurement in response to the IR images without the light pattern and the RGB images and select a mode of operation for an IR channel control and an RGB channel control in response to the IR interference measurement. The control signal may be configured to adjust an exposure for the sensor.

20 Claims, 13 Drawing Sheets

INTELLIGENT AUTO-EXPOSURE CONTROL FOR RGB-IR SENSOR

This application relates to China Patent Application No. 202210373846.4, filed on Apr. 17, 2022, which is hereby incorporated by reference in its entirety.

FIELD OF THE INVENTION

The invention relates to video and image capture generally and, more particularly, to a method and/or apparatus for implementing intelligent auto-exposure control for RGB-IR sensor.

BACKGROUND

There has been a rapid development in machine vision, optical technology, and artificial intelligence. Three-dimensional (3D) reconstruction has become an important branch of machine vision due to advancements in robotics and deep learning technology. One method of active 3D reconstruction is performed using a monocular speckle structured light system to generate depth maps. RGB-IR sensors can be used to capture the infrared data, color data and the monocular speckle structured light.

An RGB-IR sensor is a single camera sensor that exposes to both of visible (RGB) light and infrared (IR) light. RGB and IR images are captured by a single sensor. Due to physical limitations, sensor controls of a camera (i.e., shutter and gain) are shared by both RGB and IR channels. In various environments, the lighting conditions of visible light and IR light are different, which results in RGB images and IR images captured at the same time having inconsistent brightness. A fixed auto-exposure (AE) adjustment method has shortcomings when handling different lighting conditions on different RGB and IR channels.

Furthermore, the IR channel is very sensitive to IR interferences. A small amount of infrared light (i.e., from sunlight) can easily result in an overexposed IR image if the AE is not controlled properly. Without proper AE control, the RGB channel may be underexposed when a shutter value is too small. The balance between the brightness of the RGB image channel and the IR image channels at various light conditions becomes an issue for RGB-IR sensors.

It would be desirable to implement intelligent auto-exposure control for RGB-IR sensor.

SUMMARY

The invention concerns an apparatus comprising a structured light projector, an image sensor and a processor. The structured light projector may be configured to toggle a structured light pattern in response to a timing signal. The image sensor may be configured to generate pixel data. The processor may be configured to process the pixel data arranged as video frames, extract IR images with the structured light pattern, IR images without the structured light pattern and RGB images from the video frames, generate a sensor control signal in response to the IR images with the structured light pattern and the RGB images, calculate an IR interference measurement in response to the IR images without the structured light pattern and the RGB images and select a mode of operation for an IR channel control and an RGB/IR channel control in response to the IR interference measurement. The sensor control signal may be configured to adjust an exposure for the image sensor for both the IR images with the structured light pattern and the RGB images. The IR channel control may be configured to adjust the exposure for the IR images with the structured light pattern. The RGB/IR channel control may be configured to adjust the exposure for the RGB images and the IR images without the structured light pattern.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
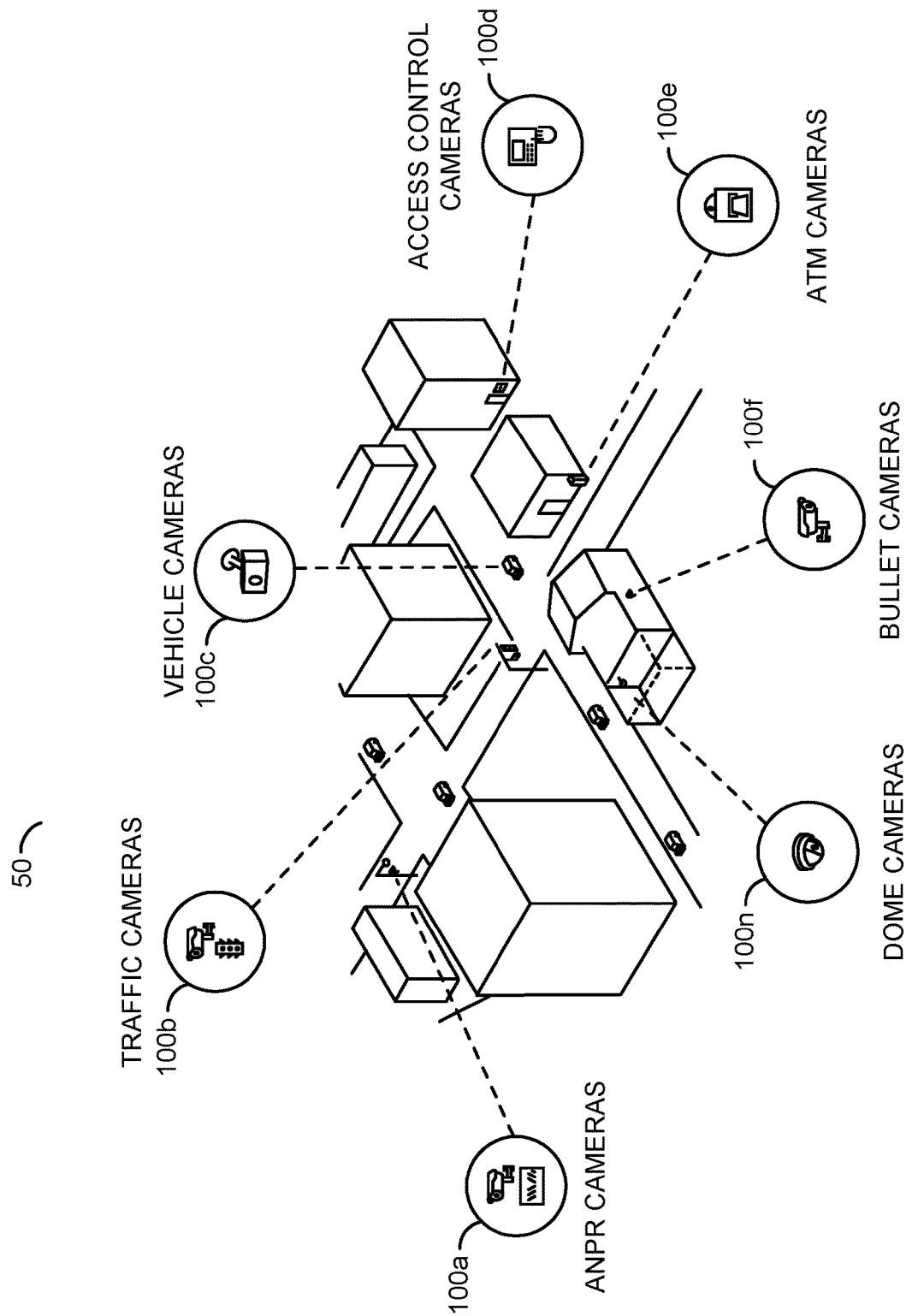
FIG. 1 is a diagram illustrating examples of edge devices that may utilize a processor configured to implement intelligent auto-exposure control for an RGB-IR sensor in accordance with example embodiments of the invention.

Embodiments of the present invention include providing intelligent auto-exposure control for RGB-IR sensor that may (i) automatically adjust sensor control, an IR channel and an RGB channel, (ii) generate statistics about an IR image channel and an RGB image channel, (iii) provide consistent brightness for IR images and RGB images across various lighting conditions, (iv) enable tuning of parameters from user input, (v) prevent overexposure of IR images due to IR interference, (vi) select different modes of operation for auto-exposure in response to an amount of IR interference detected, (vii) compare IR images without a structured light pattern to RGB images in order to determine an amount of IR interference in the environment, (viii) overcome physical limitations of an RGB-IR sensor and/or (ix) be implemented as one or more integrated circuits.

Embodiments of the present invention may be configured to implement an intelligent and dynamic auto-exposure (AE) adjustment system for an RGB-IR sensor. Instead of performing auto-exposure on each channel individually, the AE adjustment implemented may automatically adjust various exposure settings in response to RGB statistics and IR statistics. The AE adjustment implemented may be configured to coordinate sensor control, RGB channel adjustments and IR channel adjustments simultaneously.

Embodiments of the present invention may be implemented by dividing the AE adjustment into sensor control, IR channel control and RGB/IR channel control. The RGB channel and the IR channels may share the same sensor control logic. The RGB channel and the IR channel may each have an individual channel control logic. The channel control logic may be configured to automatically adjust exposure parameters (e.g., digital gain, tone curve adjustment, other post-processing parameters, etc.). By implementing individual channel control logic for the RGB channel and the IR channel, the RGB images and the IR images may be tuned to similar brightness levels even under conditions that have different visible light and IR light.

Embodiments of the present invention may be configured to operate under multiple different modes of operation to avoid problems with IR interference sensitivity. The amount of IR interference may be detected. In response to the amount of IR interference detected, the AE adjustment may be configured to determine whether to operate under a Digital Gain First mode of operation or a Shutter First mode of operation. An aggressiveness value may be received as a user input for additional manual tuning to determine how the mode of operation is applied and/or functions.

In an example, in sunny conditions (e.g., IR interference from sunlight may result in overexposure for an RGB-IR sensor that does not implement the intelligent AE adjustment) the AE adjustment system may select the Digital Gain First mode of operation. The Digital Gain First mode of operation may adjust a shutter time to a low value (e.g., depending on the aggressiveness value) and allow a digital gain to increase image brightness first. The Digital Gain First mode may enable the IR channel to reduce an effect of IR interference from the sunlight. The IR fill light (e.g., a structured light pattern) that may have a high output power may still be exposed in the IR channel. Reducing the amount of sunlight may result in a dark RGB image. However, the AE adjustment system may implement digital gain and tone curve adjustments to enhance brightness in the RGB image channel. Once the digital gain reaches a maximum value, the shutter time may be increased if adjusting the digital gain alone is insufficient.

In another example, in a low IR interference environment, the AE adjustment system may select the Shutter First mode of operation. The Shutter First mode of operation may adjust the shutter time to be a longer shutter time compared to the Digital Gain First mode of operation. For example, the longer the shutter time, the more lines of the RGB-IR sensor may be exposed for the IR fill light (e.g., the structured light pattern). Once the shutter time reaches a maximum value, digital gain and tone mapping may be performed if adjusting the shutter time alone is insufficient.

The AE system may be configured to determine when to switch between the Digital Gain First mode of operation and the Shutter First mode of operation in response to an amount of IR interference detected. Embodiments of the present invention may be configured to measure the amount of IR interference in the environment. In an example, an RGB image and an IR image (e.g., captured while the structured light pattern is toggled off) may be used as input to determine the amount of IR interference. An average intensity of the two images may be calculated. For example, if the intensity of the IR image divided by the intensity of the RGB image exceeds a predetermined threshold, then the IR interference may be determined to be a high value. The AE system may select the mode of operation in response to whether or not the IR interference is determined to be a high value. By selecting the appropriate mode of operation based on the IR interference conditions, the AE system may enable the RGB-IR sensor to have consistent performance in various lighting conditions of visible light and IR light. Providing the consistent performance in various IR and visible lighting conditions, may overcomes the physical limitation of the RGB-IR sensor.

Embodiments of the present invention may provide auto-exposure control for both RGB and IR channels. The auto-exposure control may be based on channel statistics. Different strategies for auto-exposure control may be selected for different lighting scenarios (e.g., visual light intensity compared to IR light intensity). The auto-exposure may provide an intelligent auto-exposure control for an RGB-IR sensor.

Referring to FIG. 1, a diagram illustrating examples of edge devices that may utilize a processor configured to implement intelligent auto-exposure control for an RGB-IR sensor in accordance with example embodiments of the invention is shown. An overhead view of an area 50 is shown. In the example shown, the area 50 may be an outdoor location. Streets, vehicles and buildings are shown.

Devices 100a-100n are shown at various locations in the area 50. The devices 100a-100n may each implement an edge device. The edge devices 100a-100n may comprise smart IP cameras (e.g., camera systems). The edge devices 100a-100n may comprise low power technology designed to be deployed in embedded platforms at the edge of a network (e.g., microprocessors running on sensors, cameras, or other battery-powered devices), where power consumption is a critical concern. In an example, the edge devices 100a-100n may comprise various traffic cameras and intelligent transportation systems (ITS) solutions.

The edge devices 100a-100n may be implemented for various applications. In the example shown, the edge devices 100a-100n may comprise automated number plate recognition (ANPR) cameras 100a, traffic cameras 100b, vehicle cameras 100c, access control cameras 100d, automatic teller machine (ATM) cameras 100e, bullet cameras 100f, dome cameras 100n, etc. In an example, the edge devices 100a-100n may be implemented as traffic cameras and intelligent transportation systems (ITS) solutions designed to enhance roadway security with a combination of person and vehicle detection, vehicle make/model recognition, and automatic number plate recognition (ANPR) capabilities.

In the example shown, the area 50 may be an outdoor location. In some embodiments, the edge devices 100a-100n may be implemented at various indoor locations. In an example, edge devices 100a-100n may incorporate a convolutional neural network in order to be utilized in security (surveillance) applications and/or access control applications. In an example, the edge devices 100a-100n implemented as security camera and access control applications may comprise battery-powered cameras, doorbell cameras, outdoor cameras, indoor cameras, etc. The security camera and access control applications may realize performance benefits from application of a convolutional neural network in accordance with embodiments of the invention. In an example, an edge device utilizing a convolutional neural network in accordance with an embodiment of the invention may take massive amounts of image data and make on-device inferences to obtain useful information (e.g., multiple time instances of images per network execution) with reduced bandwidth and/or reduced power consumption. The design, type and/or application performed by the edge devices 100a-100n may be varied according to the design criteria of a particular implementation.

Figure 2:
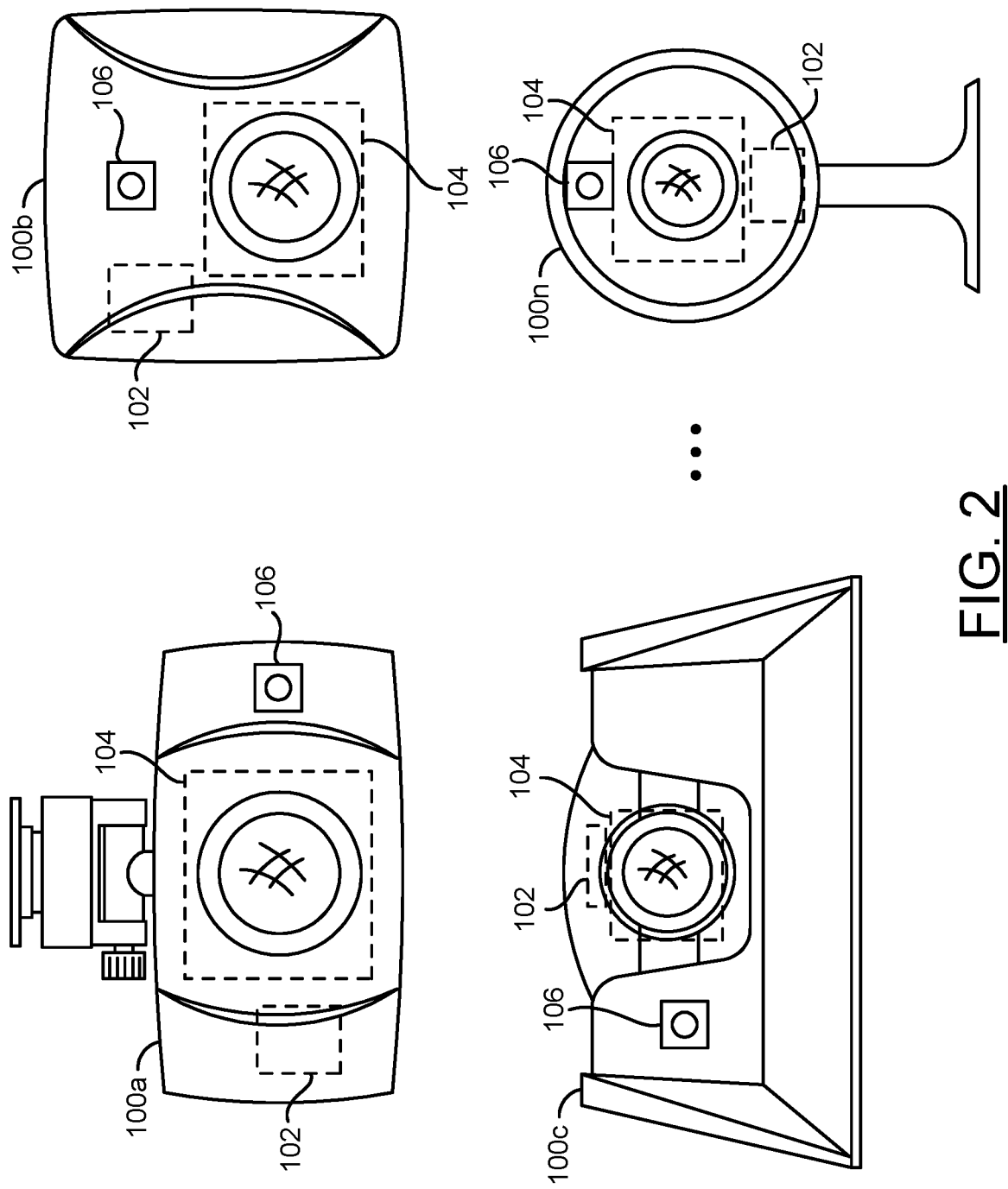
FIG. 2 is a diagram illustrating example cameras implementing an example embodiment of the present invention.

Referring to FIG. 2, a diagram illustrating example edge device cameras implementing an example embodiment of the present invention is shown. The camera systems 100a-100n are shown. Each camera device 100a-100n may have a different style and/or use case. For example, the camera 100a may be an action camera, the camera 100b may be a ceiling mounted security camera, the camera 100n may be a webcam, etc. Other types of cameras may be implemented (e.g., home security cameras, battery powered cameras, doorbell cameras, stereo cameras, etc.). The design/style of the cameras 100a-100n may be varied according to the design criteria of a particular implementation.

Each of the camera systems 100a-100n may comprise a block (or circuit) 102, a block (or circuit) 104 and/or a block (or circuit) 106. The circuit 102 may implement a processor. The circuit 104 may implement a capture device. The circuit 106 may implement a structured light projector. The camera systems 100a-100n may comprise other components (not shown). Details of the components of the cameras 100a-100n may be described in association with FIG. 3.

The processor 102 may be configured to implement an artificial neural network (ANN). In an example, the ANN may comprise a convolutional neural network (CNN). The processor 102 may be configured to implement a video encoder. The processor 102 may be configured to process the pixel data arranged as video frames. The capture device 104 may be configured to capture pixel data that may be used by the processor 102 to generate video frames. The structured light projector 106 may be configured to generate a structured light pattern (e.g., a speckle pattern). The structured light pattern may be projected onto a background (e.g., the environment). The capture device 104 may capture the pixel data comprising a background image (e.g., the environment) with the speckle pattern.

The cameras 100a-100n may be edge devices. The processor 102 implemented by each of the cameras 100a-100n may enable the cameras 100a-100n to implement various functionality internally (e.g., at a local level). For example, the processor 102 may be configured to perform object/event detection (e.g., computer vision operations), 3D reconstruction, liveness detection, depth map generation, video encoding and/or video transcoding on-device. For example, even advanced processes such as computer vision and 3D reconstruction may be performed by the processor 102 without uploading video data to a cloud service in order to offload computation-heavy functions (e.g., computer vision, video encoding, video transcoding, etc.).

In some embodiments, multiple camera systems may be implemented (e.g., camera systems 100a-100n may operate independently from each other. For example, each of the cameras 100a-100n may individually analyze the pixel data captured and perform the event/object detection locally. In some embodiments, the cameras 100a-100n may be configured as a network of cameras (e.g., security cameras that send video data to a central source such as network-attached storage and/or a cloud service). The locations and/or configurations of the cameras 100a-100n may be varied according to the design criteria of a particular implementation.

The capture device 104 of each of the camera systems 100a-100n may comprise a single lens (e.g., a monocular camera). The processor 102 may be configured to accelerate preprocessing of the speckle structured light for monocular 3D reconstruction. Monocular 3D reconstruction may be performed to generate depth images and/or disparity images without the use of stereo cameras.

Figure 3:
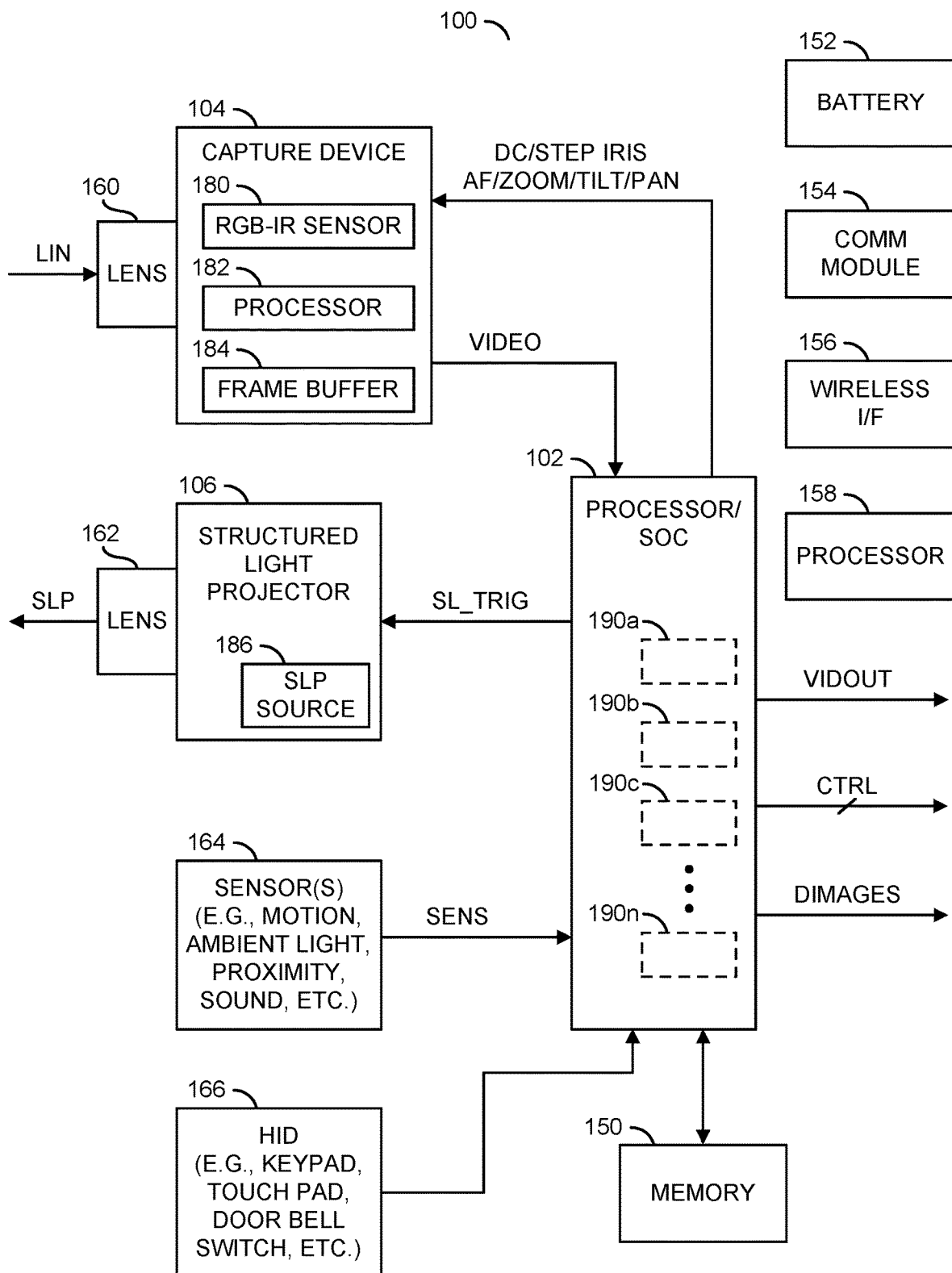
FIG. 3 is a block diagram illustrating a camera system.

Referring to FIG. 3, a block diagram of the camera system 100 is shown illustrating an example implementation. The camera system 100 may be a representative example of the cameras 100a-100n shown in association with FIG. 2. The camera system 100 may comprise the processor/SoC 102, the capture device 104, and the structured light projector 106.

The camera system 100 may further comprise a block (or circuit) 150, a block (or circuit) 152, a block (or circuit) 154, a block (or circuit) 156, a block (or circuit) 158, a block (or circuit) 160, a block (or circuit) 162, a block (or circuit) 164, and/or a block (or circuit) 166. The circuit 150 may implement a memory. The circuit 152 may implement a battery. The circuit 154 may implement a communication device. The circuit 156 may implement a wireless interface. The circuit 158 may implement a general purpose processor. The block 160 may implement an optical lens. The block 162 may implement a structured light pattern lens. The circuit 164 may implement one or more sensors. The circuit 166 may implement a human interface device (HID). In some embodiments, the camera system 100 may comprise the processor/SoC 102, the capture device 104, the IR structured light projector 106, the memory 150, the lens 160, the IR structured light projector 106, the structured light pattern lens 162, the sensors 164, the battery 152, the communication module 154, the wireless interface 156 and the processor 158. In another example, the camera system 100 may comprise processor/SoC 102, the capture device 104, the structured light projector 106, the processor 158, the lens 160, the structured light pattern lens 162, and the sensors 164 as one device, and the memory 150, the battery 152, the communication module 154, and the wireless interface 156 may be components of a separate device. The camera system 100 may comprise other components (not shown). The number, type and/or arrangement of the components of the camera system 100 may be varied according to the design criteria of a particular implementation.

The processor 102 may be implemented as a video processor. In an example, the processor 102 may be configured to receive triple-sensor video input with high-speed SLVS/MIPI-CSI/LVCMOS interfaces. In some embodiments, the processor 102 may be configured to perform depth sensing in addition to generating video frames. In an example, the depth sensing may be performed in response to depth information and/or vector light data captured in the video frames.

The memory 150 may store data. The memory 150 may implement various types of memory including, but not limited to, a cache, flash memory, memory card, random access memory (RAM), dynamic RAM (DRAM) memory, etc. The type and/or size of the memory 150 may be varied according to the design criteria of a particular implementation. The data stored in the memory 150 may correspond to a video file, motion information (e.g., readings from the sensors 164), video fusion parameters, image stabilization parameters, user inputs, computer vision models, feature sets and/or metadata information. In some embodiments, the memory 150 may store reference images. The reference images may be used for computer vision operations, 3D reconstruction, etc. In some embodiments, the reference images may comprise reference structured light images.

The processor/SoC 102 may be configured to execute computer readable code and/or process information. In various embodiments, the computer readable code may be stored within the processor/SoC 102 (e.g., microcode, etc.) and/or in the memory 150. In an example, the processor/SoC 102 may be configured to execute one or more artificial neural network models (e.g., facial recognition CNN, object detection CNN, object classification CNN, 3D reconstruction CNN, liveness detection CNN, etc.) stored in the memory 150. In an example, the memory 150 may store one or more directed acyclic graphs (DAGs) and one or more sets of weights and biases defining the one or more artificial neural network models. The processor/SoC 102 may be configured to receive input from and/or present output to the memory 150. The processor/SoC 102 may be configured to present and/or receive other signals (not shown). The number and/or types of inputs and/or outputs of the processor/SoC 102 may be varied according to the design criteria of a particular implementation. The processor/SoC 102 may be configured for low power (e.g., battery) operation.

The battery 152 may be configured to store and/or supply power for the components of the camera system 100. The dynamic driver mechanism for a rolling shutter sensor may be configured to conserve power consumption. Reducing the power consumption may enable the camera system 100 to operate using the battery 152 for extended periods of time without recharging. The battery 152 may be rechargeable. The battery 152 may be built-in (e.g., non-replaceable) or replaceable. The battery 152 may have an input for connection to an external power source (e.g., for charging). In some embodiments, the apparatus 100 may be powered by an external power supply (e.g., the battery 152 may not be implemented or may be implemented as a back-up power supply). The battery 152 may be implemented using various battery technologies and/or chemistries. The type of the battery 152 implemented may be varied according to the design criteria of a particular implementation.

The communications module 154 may be configured to implement one or more communications protocols. For example, the communications module 154 and the wireless interface 156 may be configured to implement one or more of, IEEE 102.11, IEEE 102.15, IEEE 102.15.1, IEEE 102.15.2, IEEE 102.15.3, IEEE 102.15.4, IEEE 102.15.5, IEEE 102.20, Bluetooth®, and/or ZigBee®. In some embodiments, the communication module 154 may be a hard-wired data port (e.g., a USB port, a mini-USB port, a USB-C connector, HDMI port, an Ethernet port, a DisplayPort interface, a Lightning port, etc.). In some embodiments, the wireless interface 156 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the camera system 100 is implemented as a wireless camera, the protocol implemented by the communications module 154 and wireless interface 156 may be a wireless communications protocol. The type of communications protocols implemented by the communications module 154 may be varied according to the design criteria of a particular implementation.

The communications module 154 and/or the wireless interface 156 may be configured to generate a broadcast signal as an output from the camera system 100. The broadcast signal may send video data, disparity data and/or a control signal(s) to external devices. For example, the broadcast signal may be sent to a cloud storage service (e.g., a storage service capable of scaling on demand). In some embodiments, the communications module 154 may not transmit data until the processor/SoC 102 has performed video analytics to determine that an object is in the field of view of the camera system 100.

In some embodiments, the communications module 154 may be configured to generate a manual control signal. The manual control signal may be generated in response to a signal from a user received by the communications module 154. The manual control signal may be configured to activate the processor/SoC 102. The processor/SoC 102 may be activated in response to the manual control signal regardless of the power state of the camera system 100.

In some embodiments, the communications module 154 and/or the wireless interface 156 may be configured to receive a feature set. The feature set received may be used to detect events and/or objects. For example, the feature set may be used to perform the computer vision operations. The feature set information may comprise instructions for the processor 102 for determining which types of objects correspond to an object and/or event of interest.

In some embodiments, the communications module 154 and/or the wireless interface 156 may be configured to receive user input. The user input may enable a user to adjust operating parameters for various features implemented by the processor 102. In some embodiments, the communications module 154 and/or the wireless interface 156 may be configured to interface (e.g., using an application programming interface (API) with an application (e.g., an app). For example, the app may be implemented on a smartphone to enable an end user to adjust various settings and/or parameters for the various features implemented by the processor 102 (e.g., set video resolution, select frame rate, select output format, set tolerance parameters for 3D reconstruction, etc.).

The processor 158 may be implemented using a general purpose processor circuit. The processor 158 may be operational to interact with the video processing circuit 102 and the memory 150 to perform various processing tasks. The processor 158 may be configured to execute computer readable instructions. In one example, the computer readable instructions may be stored by the memory 150. In some embodiments, the computer readable instructions may comprise controller operations. Generally, input from the sensors 164 and/or the human interface device 166 are shown being received by the processor 102. In some embodiments, the general purpose processor 158 may be configured to receive and/or analyze data from the sensors 164 and/or the HID 166 and make decisions in response to the input. In some embodiments, the processor 158 may send data to and/or receive data from other components of the camera system 100 (e.g., the battery 152, the communication module 154 and/or the wireless interface 156). Which of the functionality of the camera system 100 is performed by the processor 102 and the general purpose processor 158 may be varied according to the design criteria of a particular implementation.

The lens 160 may be attached to the capture device 104. The capture device 104 may be configured to receive an input signal (e.g., LIN) via the lens 160. The signal LIN may be a light input (e.g., an analog image). The lens 160 may be implemented as an optical lens. The lens 160 may provide a zooming feature and/or a focusing feature. The capture device 104 and/or the lens 160 may be implemented, in one example, as a single lens assembly. In another example, the lens 160 may be a separate implementation from the capture device 104.

The capture device 104 may be configured to convert the input light LIN into computer readable data. The capture device 104 may capture data received through the lens 160 to generate raw pixel data. In some embodiments, the capture device 104 may capture data received through the lens 160 to generate bitstreams (e.g., generate video frames). For example, the capture devices 104 may receive focused light from the lens 160. The lens 160 may be directed, tilted, panned, zoomed and/or rotated to provide a targeted view from the camera system 100 (e.g., a view for a video frame, a view for a panoramic video frame captured using multiple camera systems 100a-100n, a target image and reference image view for stereo vision, etc.). The capture device 104 may generate a signal (e.g., VIDEO). The signal VIDEO may be pixel data (e.g., a sequence of pixels that may be used to generate video frames). In some embodiments, the signal VIDEO may be video data (e.g., a sequence of video frames). The signal VIDEO may be presented to one of the inputs of the processor 102. In some embodiments, the pixel data generated by the capture device 104 may be uncompressed and/or raw data generated in response to the focused light from the lens 160. In some embodiments, the output of the capture device 104 may be digital video signals.

In an example, the capture device 104 may comprise a block (or circuit) 180, a block (or circuit) 182, and a block (or circuit) 184. The circuit 180 may be an image sensor. The circuit 182 may be a processor and/or logic. The circuit 184 may be a memory circuit (e.g., a frame buffer). The lens 160 (e.g., camera lens) may be directed to provide a view of an environment surrounding the camera system 100. The lens 160 may be aimed to capture environmental data (e.g., the light input LIN). The lens 160 may be a wide-angle lens and/or fish-eye lens (e.g., lenses capable of capturing a wide field of view). The lens 160 may be configured to capture and/or focus the light for the capture device 104. Generally, the image sensor 180 is located behind the lens 160. Based on the captured light from the lens 160, the capture device 104 may generate a bitstream and/or video data (e.g., the signal VIDEO).

The capture device 104 may be configured to capture video image data (e.g., light collected and focused by the lens 160). The capture device 104 may capture data received through the lens 160 to generate a video bitstream (e.g., pixel data for a sequence of video frames). In various embodiments, the lens 160 may be implemented as a fixed focus lens. A fixed focus lens generally facilitates smaller size and low power. In an example, a fixed focus lens may be used in battery powered, doorbell, and other low power camera applications. In some embodiments, the lens 160 may be directed, tilted, panned, zoomed and/or rotated to capture the environment surrounding the camera system 100 (e.g., capture data from the field of view). In an example, professional camera models may be implemented with an active lens system for enhanced functionality, remote control, etc.

The capture device 104 may transform the received light into a digital data stream. In some embodiments, the capture device 104 may perform an analog to digital conversion. For example, the image sensor 180 may perform a photoelectric conversion of the light received by the lens 160. The processor/logic 182 may transform the digital data stream into a video data stream (or bitstream), a video file, and/or a number of video frames. In an example, the capture device 104 may present the video data as a digital video signal (e.g., VIDEO). The digital video signal may comprise the video frames (e.g., sequential digital images and/or audio). In some embodiments, the capture device 104 may comprise a microphone for capturing audio. In some embodiments, the microphone may be implemented as a separate component (e.g., one of the sensors 164).

The video data captured by the capture device 104 may be represented as a signal/bitstream/data VIDEO (e.g., a digital video signal). The capture device 104 may present the signal VIDEO to the processor/SoC 102. The signal VIDEO may represent the video frames/video data. The signal VIDEO may be a video stream captured by the capture device 104. In some embodiments, the signal VIDEO may comprise pixel data that may be operated on by the processor 102 (e.g., a video processing pipeline, an image signal processor (ISP), etc.). The processor 102 may generate the video frames in response to the pixel data in the signal VIDEO.

The signal VIDEO may comprise pixel data arranged as video frames. The signal VIDEO may be images comprising a background (e.g., objects and/or the environment captured) and the speckle pattern generated by the structured light projector 106. The signal VIDEO may comprise single-channel source images. The single-channel source images may be generated in response to capturing the pixel data using the monocular lens 160.

The image sensor 180 may receive the input light LIN from the lens 160 and transform the light LIN into digital data (e.g., the bitstream). For example, the image sensor 180 may perform a photoelectric conversion of the light from the lens 160. In some embodiments, the image sensor 180 may have extra margins that are not used as part of the image output. In some embodiments, the image sensor 180 may not have extra margins. In various embodiments, the image sensor 180 may be configured to generate an RGB-IR video signal. In an infrared light only illuminated field of view, the image sensor 180 may generate a monochrome (B/W) video signal. In a field of view illuminated by both IR light and visible light, the image sensor 180 may be configured to generate color information in addition to the monochrome video signal. In various embodiments, the image sensor 180 may be configured to generate a video signal in response to visible and/or infrared (IR) light.

In some embodiments, the camera sensor 180 may comprise a rolling shutter sensor or a global shutter sensor. In an example, the rolling shutter sensor 180 may implement an RGB-IR sensor. In some embodiments, the capture device 104 may comprise a rolling shutter IR sensor and an RGB sensor (e.g., implemented as separate components). In an example, the rolling shutter sensor 180 may be implemented as an RGB-IR rolling shutter complementary metal oxide semiconductor (CMOS) image sensor. In one example, the rolling shutter sensor 180 may be configured to assert a signal that indicates a first line exposure time. In one example, the rolling shutter sensor 180 may apply a mask to a monochrome sensor. In an example, the mask may comprise a plurality of units containing one red pixel, one green pixel, one blue pixel, and one IR pixel. The IR pixel may contain red, green, and blue filter materials that effectively absorb all of the light in the visible spectrum, while allowing the longer infrared wavelengths to pass through with minimal loss. With a rolling shutter, as each line (or row) of the sensor starts exposure, all pixels in the line (or row) may start exposure simultaneously.

The processor/logic 182 may transform the bitstream into a human viewable content (e.g., video data that may be understandable to an average person regardless of image quality, such as the video frames and/or pixel data that may be converted into video frames by the processor 102). For example, the processor/logic 182 may receive pure (e.g., raw) data from the image sensor 180 and generate (e.g., encode) video data (e.g., the bitstream) based on the raw data. The capture device 104 may have the memory 184 to store the raw data and/or the processed bitstream. For example, the capture device 104 may implement the frame memory and/or buffer 184 to store (e.g., provide temporary storage and/or cache) one or more of the video frames (e.g., the digital video signal). In some embodiments, the processor/logic 182 may perform analysis and/or correction on the video frames stored in the memory/buffer 184 of the capture device 104. The processor/logic 182 may provide status information about the captured video frames.

The structured light projector 106 may comprise a block (or circuit) 186. The circuit 186 may implement a structured light source. The structured light source 186 may be configured to generate a signal (e.g., SLP). The signal SLP may be a structured light pattern (e.g., a speckle pattern). The signal SLP may be projected onto an environment near the camera system 100. The structured light pattern SLP may be captured by the capture device 104 as part of the light input LIN.

The structured light pattern lens 162 may be a lens for the structured light projector 106. The structured light pattern lens 162 may be configured to enable the structured light SLP generated by the structured light source 186 of the structured light projector 106 to be emitted while protecting the structured light source 186. The structured light pattern lens 162 may be configured to decompose the laser light pattern generated by the structured light source 186 into a pattern array (e.g., a dense dot pattern array for a speckle pattern).

In an example, the structured light source 186 may be implemented as an array of vertical-cavity surface-emitting lasers (VCSELs) and a lens. However, other types of structured light sources may be implemented to meet design criteria of a particular application. In an example, the array of VCSELs is generally configured to generate a laser light pattern (e.g., the signal SLP). The lens is generally configured to decompose the laser light pattern to a dense dot pattern array. In an example, the structured light source 186 may implement a near infrared (NIR) light source. In various embodiments, the light source of the structured light source 186 may be configured to emit light with a wavelength of approximately 940 nanometers (nm), which is not visible to the human eye. However, other wavelengths may be utilized. In an example, a wavelength in a range of approximately 800-1000 nm may be utilized.

The sensors 164 may implement a number of sensors including, but not limited to, motion sensors, ambient light sensors, proximity sensors (e.g., ultrasound, radar, lidar, etc.), audio sensors (e.g., a microphone), etc. In embodiments implementing a motion sensor, the sensors 164 may be configured to detect motion anywhere in the field of view monitored by the camera system 100 (or in some locations outside of the field of view). In various embodiments, the detection of motion may be used as one threshold for activating the capture device 104. The sensors 164 may be implemented as an internal component of the camera system 100 and/or as a component external to the camera system 100. In an example, the sensors 164 may be implemented as a passive infrared (PIR) sensor. In another example, the sensors 164 may be implemented as a smart motion sensor. In yet another example, the sensors 164 may be implemented as a microphone. In embodiments implementing the smart motion sensor, the sensors 164 may comprise a low resolution image sensor configured to detect motion and/or persons.

In various embodiments, the sensors 164 may generate a signal (e.g., SENS). The signal SENS may comprise a variety of data (or information) collected by the sensors 164. In an example, the signal SENS may comprise data collected in response to motion being detected in the monitored field of view, an ambient light level in the monitored field of view, and/or sounds picked up in the monitored field of view. However, other types of data may be collected and/or generated based upon design criteria of a particular application. The signal SENS may be presented to the processor/SoC 102. In an example, the sensors 164 may generate (assert) the signal SENS when motion is detected in the field of view monitored by the camera system 100. In another example, the sensors 164 may generate (assert) the signal SENS when triggered by audio in the field of view monitored by the camera system 100. In still another example, the sensors 164 may be configured to provide directional information with respect to motion and/or sound detected in the field of view. The directional information may also be communicated to the processor/SoC 102 via the signal SENS.

The HID 166 may implement an input device. For example, the HID 166 may be configured to receive human input. In one example, the HID 166 may be configured to receive a password input from a user. In another example, the HID 166 may be configured to receive user input in order to provide various parameters and/or settings to the processor 102 and/or the memory 150. In some embodiments, the camera system 100 may include a keypad, a touch pad (or screen), a doorbell switch, and/or other human interface devices (HIDs) 166. In an example, the sensors 164 may be configured to determine when an object is in proximity to the HIDs 166. In an example where the camera system 100 is implemented as part of an access control application, the capture device 104 may be turned on to provide images for identifying a person attempting access, and illumination of a lock area and/or for an access touch pad 166 may be turned on. For example, a combination of input from the HIDs 166 (e.g., a password or PIN number) may be combined with the liveness judgment and/or depth analysis performed by the processor 102 to enable two-factor authentication.

The processor/SoC 102 may receive the signal VIDEO and the signal SENS. The processor/SoC 102 may generate one or more video output signals (e.g., VIDOUT), one or more control signals (e.g., CTRL) and/or one or more depth data signals (e.g., DIMAGES) based on the signal VIDEO, the signal SENS, and/or other input. In some embodiments, the signals VIDOUT, DIMAGES and CTRL may be generated based on analysis of the signal VIDEO and/or objects detected in the signal VIDEO.

In various embodiments, the processor/SoC 102 may be configured to perform one or more of feature extraction, object detection, object tracking, 3D reconstruction, liveness detection and object identification. For example, the processor/SoC 102 may determine motion information and/or depth information by analyzing a frame from the signal VIDEO and comparing the frame to a previous frame. The comparison may be used to perform digital motion estimation. In some embodiments, the processor/SoC 102 may be configured to generate the video output signal VIDOUT comprising video data and/or the depth data signal DIMAGES comprising disparity maps and depth maps from the signal VIDEO. The video output signal VIDOUT and/or the depth data signal DIMAGES may be presented to the memory 150, the communications module 154, and/or the wireless interface 156. In some embodiments, the video signal VIDOUT and/or the depth data signal DIMAGES may be used internally by the processor 102 (e.g., not presented as output).

The signal VIDOUT may be presented to the communication device 156. In some embodiments, the signal VID- OUT may comprise encoded video frames generated by the processor 102. In some embodiments, the encoded video frames may comprise a full video stream (e.g., encoded video frames representing all video captured by the capture device 104). The encoded video frames may be encoded, cropped, stitched and/or enhanced versions of the pixel data received from the signal VIDEO. In an example, the encoded video frames may be a high resolution, digital, encoded, de-warped, stabilized, cropped, blended, stitched and/or rolling shutter effect corrected version of the signal VIDEO.

In some embodiments, the signal VIDOUT may be generated based on video analytics (e.g., computer vision operations) performed by the processor 102 on the video frames generated. The processor 102 may be configured to perform the computer vision operations to detect objects and/or events in the video frames and then convert the detected objects and/or events into statistics and/or parameters. In one example, the data determined by the computer vision operations may be converted to the human-readable format by the processor 102. The data from the computer vision operations may be used to detect objects and/or events. The computer vision operations may be performed by the processor 102 locally (e.g., without communicating to an external device to offload computing operations). For example, the locally performed computer vision operations may enable the computer vision operations to be performed by the processor 102 and avoid heavy video processing running on back-end servers. Avoiding video processing running on back-end (e.g., remotely located) servers may preserve privacy.

In some embodiments, the signal VIDOUT may be data generated by the processor 102 (e.g., video analysis results, audio/speech analysis results, etc.) that may be communicated to a cloud computing service in order to aggregate information and/or provide training data for machine learning (e.g., to improve object detection, to improve audio detection, to improve liveness detection, etc.). In some embodiments, the signal VIDOUT may be provided to a cloud service for mass storage (e.g., to enable a user to retrieve the encoded video using a smartphone and/or a desktop computer). In some embodiments, the signal VIDOUT may comprise the data extracted from the video frames (e.g., the results of the computer vision), and the results may be communicated to another device (e.g., a remote server, a cloud computing system, etc.) to offload analysis of the results to another device (e.g., offload analysis of the results to a cloud computing service instead of performing all the analysis locally). The type of information communicated by the signal VIDOUT may be varied according to the design criteria of a particular implementation.

The signal CTRL may be configured to provide a control signal. The signal CTRL may be generated in response to decisions made by the processor 102. In one example, the signal CTRL may be generated in response to objects detected and/or characteristics extracted from the video frames. The signal CTRL may be configured to enable, disable, change a mode of operations of another device. In one example, a door controlled by an electronic lock may be locked/unlocked in response the signal CTRL. In another example, a device may be set to a sleep mode (e.g., a low-power mode) and/or activated from the sleep mode in response to the signal CTRL. In yet another example, an alarm and/or a notification may be generated in response to the signal CTRL. The type of device controlled by the signal CTRL, and/or a reaction performed by of the device in response to the signal CTRL may be varied according to the design criteria of a particular implementation.

The signal CTRL may be generated based on data received by the sensors 164 (e.g., a temperature reading, a motion sensor reading, etc.). The signal CTRL may be generated based on input from the HID 166. The signal CTRL may be generated based on behaviors of people detected in the video frames by the processor 102. The signal CTRL may be generated based on a type of object detected (e.g., a person, an animal, a vehicle, etc.). The signal CTRL may be generated in response to particular types of objects being detected in particular locations. The signal CTRL may be generated in response to user input in order to provide various parameters and/or settings to the processor 102 and/or the memory 150. The processor 102 may be configured to generate the signal CTRL in response to sensor fusion operations (e.g., aggregating information received from disparate sources). The processor 102 may be configured to generate the signal CTRL in response to results of liveness detection performed by the processor 102. The conditions for generating the signal CTRL may be varied according to the design criteria of a particular implementation.

The signal DIMAGES may comprise one or more of depth maps and/or disparity maps generated by the processor 102. The signal DIMAGES may be generated in response to 3D reconstruction performed on the monocular single-channel images. The signal DIMAGES may be generated in response to analysis of the captured video data and the structured light pattern SLP.

The multi-step approach to activating and/or disabling the capture device 104 based on the output of the motion sensor 164 and/or any other power consuming features of the camera system 100 may be implemented to reduce a power consumption of the camera system 100 and extend an operational lifetime of the battery 152. A motion sensor of the sensors 164 may have a low drain on the battery 152 (e.g., less than 10 W). In an example, the motion sensor of the sensors 164 may be configured to remain on (e.g., always active) unless disabled in response to feedback from the processor/SoC 102. The video analytics performed by the processor/SoC 102 may have a relatively large drain on the battery 152 (e.g., greater than the motion sensor 164). In an example, the processor/SoC 102 may be in a low-power state (or power-down) until some motion is detected by the motion sensor of the sensors 164.

The camera system 100 may be configured to operate using various power states. For example, in the power-down state (e.g., a sleep state, a low-power state) the motion sensor of the sensors 164 and the processor/SoC 102 may be on and other components of the camera system 100 (e.g., the image capture device 104, the memory 150, the communications module 154, etc.) may be off. In another example, the camera system 100 may operate in an intermediate state. In the intermediate state, the image capture device 104 may be on and the memory 150 and/or the communications module 154 may be off. In yet another example, the camera system 100 may operate in a power-on (or high power) state. In the power-on state, the sensors 164, the processor/SoC 102, the capture device 104, the memory 150, and/or the communications module 154 may be on. The camera system 100 may consume some power from the battery 152 in the power-down state (e.g., a relatively small and/or minimal amount of power). The camera system 100 may consume more power from the battery 152 in the power-on state. The number of power states and/or the components of the camera system 100 that are on while the camera system 100 operates in each of the power states may be varied according to the design criteria of a particular implementation.

In some embodiments, the camera system 100 may be implemented as a system on chip (SoC). For example, the camera system 100 may be implemented as a printed circuit board comprising one or more components. The camera system 100 may be configured to perform intelligent video analysis on the video frames of the video. The camera system 100 may be configured to crop and/or enhance the video.

In some embodiments, the video frames may be some view (or derivative of some view) captured by the capture device 104. The pixel data signals may be enhanced by the processor 102 (e.g., color conversion, noise filtering, auto exposure, auto white balance, auto focus, etc.). In some embodiments, the video frames may provide a series of cropped and/or enhanced video frames that improve upon the view from the perspective of the camera system 100 (e.g., provides night vision, provides High Dynamic Range (HDR) imaging, provides more viewing area, highlights detected objects, provides additional data such as a numerical distance to detected objects, etc.) to enable the processor 102 to see the location better than a person would be capable of with human vision.

The encoded video frames may be processed locally. In one example, the encoded, video may be stored locally by the memory 150 to enable the processor 102 to facilitate the computer vision analysis internally (e.g., without first uploading video frames to a cloud service). The processor 102 may be configured to select the video frames to be packetized as a video stream that may be transmitted over a network (e.g., a bandwidth limited network).

In some embodiments, the processor 102 may be configured to perform sensor fusion operations. The sensor fusion operations performed by the processor 102 may be configured to analyze information from multiple sources (e.g., the capture device 104, the sensors 164 and the HID 166). By analyzing various data from disparate sources, the sensor fusion operations may be capable of making inferences about the data that may not be possible from one of the data sources alone. For example, the sensor fusion operations implemented by the processor 102 may analyze video data (e.g., mouth movements of people) as well as the speech patterns from directional audio. The disparate sources may be used to develop a model of a scenario to support decision making. For example, the processor 102 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 102 may implement convolutional neural network capabilities. The convolutional neural network capabilities may implement computer vision using deep learning techniques. The convolutional neural network capabilities may be configured to implement pattern and/or image recognition using a training process through multiple layers of feature-detection. The computer vision and/or convolutional neural network capabilities may be performed locally by the processor 102. In some embodiments, the processor 102 may receive training data and/or feature set information from an external source. For example, an external device (e.g., a cloud service) may have access to various sources of data to use as training data that may be unavailable to the camera system 100. However, the computer vision operations performed using the feature set may be performed using the computational resources of the processor 102 within the camera system 100.

A video pipeline of the processor 102 may be configured to locally perform de-warping, cropping, enhancements, rolling shutter corrections, stabilizing, downscaling, packetizing, compression, conversion, blending, synchronizing and/or other video operations. The video pipeline of the processor 102 may enable multi-stream support (e.g., generate multiple bitstreams in parallel, each comprising a different bitrate). In an example, the video pipeline of the processor 102 may implement an image signal processor (ISP) with a 320 MPixels/s input pixel rate. The architecture of the video pipeline of the processor 102 may enable the video operations to be performed on high resolution video and/or high bitrate video data in real-time and/or near real-time. The video pipeline of the processor 102 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline may enable 4K ultra high resolution with H.264 encoding at double real time speed (e.g., 60 fps), 4K ultra high resolution with H.265/HEVC at 30 fps and/or 4KAVC encoding (e.g., 4KP30 AVC and HEVC encoding with multi-stream support). The type of video operations and/or the type of video data operated on by the processor 102 may be varied according to the design criteria of a particular implementation.

The camera sensor 180 may implement a high-resolution sensor. Using the high resolution sensor 180, the processor 102 may combine over-sampling of the image sensor 180 with digital zooming within a cropped area. The over-sampling and digital zooming may each be one of the video operations performed by the processor 102. The over-sampling and digital zooming may be implemented to deliver higher resolution images within the total size constraints of a cropped area.

In some embodiments, the lens 160 may implement a fisheye lens. One of the video operations implemented by the processor 102 may be a dewarping operation. The processor 102 may be configured to dewarp the video frames generated. The dewarping may be configured to reduce and/or remove acute distortion caused by the fisheye lens and/or other lens characteristics. For example, the dewarping may reduce and/or eliminate a bulging effect to provide a rectilinear image.

The processor 102 may be configured to crop (e.g., trim to) a region of interest from a full video frame (e.g., generate the region of interest video frames). The processor 102 may generate the video frames and select an area. In an example, cropping the region of interest may generate a second image. The cropped image (e.g., the region of interest video frame) may be smaller than the original video frame (e.g., the cropped image may be a portion of the captured video).

The area of interest may be dynamically adjusted based on the location of an audio source. For example, the detected audio source may be moving, and the location of the detected audio source may move as the video frames are captured. The processor 102 may update the selected region of interest coordinates and dynamically update the cropped section (e.g., directional microphones implemented as one or more of the sensors 164 may dynamically update the location based on the directional audio captured). The cropped section may correspond to the area of interest selected. As the area of interest changes, the cropped portion may change. For example, the selected coordinates for the area of interest may change from frame to frame, and the processor 102 may be configured to crop the selected region in each frame.

The processor 102 may be configured to over-sample the image sensor 180. The over-sampling of the image sensor 180 may result in a higher resolution image. The processor 102 may be configured to digitally zoom into an area of a video frame. For example, the processor 102 may digitally zoom into the cropped area of interest. For example, the processor 102 may establish the area of interest based on the directional audio, crop the area of interest, and then digitally zoom into the cropped region of interest video frame.

The dewarping operations performed by the processor 102 may adjust the visual content of the video data. The adjustments performed by the processor 102 may cause the visual content to appear natural (e.g., appear as seen by a person viewing the location corresponding to the field of view of the capture device 104). In an example, the dewarping may alter the video data to generate a rectilinear video frame (e.g., correct artifacts caused by the lens characteristics of the lens 160). The dewarping operations may be implemented to correct the distortion caused by the lens 160. The adjusted visual content may be generated to enable more accurate and/or reliable object detection.

Various features (e.g., dewarping, digitally zooming, cropping, etc.) may be implemented in the processor 102 as hardware modules. Implementing hardware modules may increase the video processing speed of the processor 102 (e.g., faster than a software implementation). The hardware implementation may enable the video to be processed while reducing an amount of delay. The hardware components used may be varied according to the design criteria of a particular implementation.

The processor 102 is shown comprising a number of blocks (or circuits) 190a-190n. The blocks 190a-190n may implement various hardware modules implemented by the processor 102. The hardware modules 190a-190n may be configured to provide various hardware components to implement a video processing pipeline. The circuits 190a-190n may be configured to receive the pixel data VIDEO, generate the video frames from the pixel data, perform various operations on the video frames (e.g., de-warping, rolling shutter correction, cropping, upscaling, image stabilization, 3D reconstruction, liveness detection, etc.), prepare the video frames for communication to external hardware (e.g., encoding, packetizing, color correcting, etc.), parse feature sets, implement various operations for computer vision (e.g., object detection, segmentation, classification, etc.), etc. The hardware modules 190a-190n may be configured to implement various security features (e.g., secure boot, I/O virtualization, etc.). Various implementations of the processor 102 may not necessarily utilize all the features of the hardware modules 190a-190n. The features and/or functionality of the hardware modules 190a-190n may be varied according to the design criteria of a particular implementation. Details of the hardware modules 190a-190n may be described in association with U.S. patent application Ser. No. 16/831,549, filed on Apr. 16, 2020, U.S. patent application Ser. No. 16/288,922, filed on Feb. 28, 2019, U.S. patent application Ser. No. 15/593,493 (now U.S. Pat. No. 10,437,600), filed on May 12, 2017, U.S. patent application Ser. No. 15/931,942, filed on May 14, 2020, U.S. patent application Ser. No. 16/991,344, filed on Aug. 12, 2020, U.S. patent application Ser. No. 17/479,034, filed on Sep. 20, 2021, appropriate portions of which are hereby incorporated by reference in their entirety.

The hardware modules 190a-190n may be implemented as dedicated hardware modules. Implementing various functionality of the processor 102 using the dedicated hardware modules 190a-190n may enable the processor 102 to be highly optimized and/or customized to limit power consumption, reduce heat generation and/or increase processing speed compared to software implementations. The hardware modules 190a-190n may be customizable and/or programmable to implement multiple types of operations. Implementing the dedicated hardware modules 190a-190n may enable the hardware used to perform each type of calculation to be optimized for speed and/or efficiency. For example, the hardware modules 190a-190n may implement a number of relatively simple operations that are used frequently in computer vision operations that, together, may enable the computer vision operations to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects. The hardware modules 190a-190n may enable computationally intensive operations (e.g., computer vision operations, video encoding, video transcoding, 3D reconstruction, depth map generation, liveness detection, etc.) to be performed locally by the camera system 100.

One of the hardware modules 190a-190n (e.g., 190a) may implement a scheduler circuit. The scheduler circuit 190a may be configured to store a directed acyclic graph (DAG). In an example, the scheduler circuit 190a may be configured to generate and store the directed acyclic graph in response to the feature set information received (e.g., loaded). The directed acyclic graph may define the video operations to perform for extracting the data from the video frames. For example, the directed acyclic graph may define various mathematical weighting (e.g., neural network weights and/or biases) to apply when performing computer vision operations to classify various groups of pixels as particular objects.

The scheduler circuit 190a may be configured to parse the acyclic graph to generate various operators. The operators may be scheduled by the scheduler circuit 190a in one or more of the other hardware modules 190a-190n. For example, one or more of the hardware modules 190a-190n may implement hardware engines configured to perform specific tasks (e.g., hardware engines designed to perform particular mathematical operations that are repeatedly used to perform computer vision operations). The scheduler circuit 190a may schedule the operators based on when the operators may be ready to be processed by the hardware engines 190a-190n.

The scheduler circuit 190a may time multiplex the tasks to the hardware modules 190a-190n based on the availability of the hardware modules 190a-190n to perform the work. The scheduler circuit 190a may parse the directed acyclic graph into one or more data flows. Each data flow may include one or more operators. Once the directed acyclic graph is parsed, the scheduler circuit 190a may allocate the data flows/operators to the hardware engines 190a-190n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands independent operators. In various embodiments, an operator may not appear in the directed acyclic graph representation until all dependent descriptors are declared for the operands.

One of the hardware modules 190a-190n (e.g., 190b) may implement an artificial neural network (ANN) module. The artificial neural network module may be implemented as a fully connected neural network or a convolutional neural network (CNN). In an example, fully connected networks are "structure agnostic" in that there are no special assumptions that need to be made about an input. A fully-connected neural network comprises a series of fully-connected layers that connect every neuron in one layer to every neuron in the other layer. In a fully-connected layer, for n inputs and m outputs, there are n*m weights. There is also a bias value for each output node, resulting in a total of (n+1)*m parameters. In an already-trained neural network, the (n+1)*m parameters have already been determined during a training process. An already-trained neural network generally comprises an architecture specification and the set of parameters (weights and biases) determined during the training process. In another example, CNN architectures may make explicit assumptions that the inputs are images to enable encoding particular properties into a model architecture. The CNN architecture may comprise a sequence of layers with each layer transforming one volume of activations to another through a differentiable function.

In the example shown, the artificial neural network 190b may implement a convolutional neural network (CNN) module. The CNN module 190b may be configured to perform the computer vision operations on the video frames. The CNN module 190b may be configured to implement recognition of objects through multiple layers of feature detection. The CNN module 190b may be configured to calculate descriptors based on the feature detection performed. The descriptors may enable the processor 102 to determine a likelihood that pixels of the video frames correspond to particular objects (e.g., a particular make/model/year of a vehicle, identifying a person as a particular individual, detecting a type of animal, detecting characteristics of a face, etc.).

The CNN module 190b may be configured to implement convolutional neural network capabilities. The CNN module 190b may be configured to implement computer vision using deep learning techniques. The CNN module 190b may be configured to implement pattern and/or image recognition using a training process through multiple layers of feature-detection. The CNN module 190b may be configured to conduct inferences against a machine learning model.

The CNN module 190b may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching operation is generally incorporated by hardware in the CNN module 190b to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190b using dedicated hardware circuitry may enable calculating descriptor matching distances in real time.

The CNN module 190b may be configured to perform face detection, face recognition and/or liveness judgment. For example, face detection, face recognition and/or liveness judgment may be performed based on a trained neural network implemented by the CNN module 190b. In some embodiments, the CNN module 190b may be configured to generate the depth image from the structured light pattern. The CNN module 190b may be configured to perform various detection and/or recognition operations and/or perform 3D recognition operations.

The CNN module 190b may be a dedicated hardware module configured to perform feature detection of the video frames. The features detected by the CNN module 190b may be used to calculate descriptors. The CNN module 190b may determine a likelihood that pixels in the video frames belong to a particular object and/or objects in response to the descriptors. For example, using the descriptors, the CNN module 190b may determine a likelihood that pixels correspond to a particular object (e.g., a person, an item of furniture, a pet, a vehicle, etc.) and/or characteristics of the object (e.g., shape of eyes, distance between facial features, a hood of a vehicle, a body part, a license plate of a vehicle, a face of a person, clothing worn by a person, etc.). Implementing the CNN module 190b as a dedicated hardware module of the processor 102 may enable the apparatus 100 to perform the computer vision operations locally (e.g., on-chip) without relying on processing capabilities of a remote device (e.g., communicating data to a cloud computing service).

The computer vision operations performed by the CNN module 190b may be configured to perform the feature detection on the video frames in order to generate the descriptors. The CNN module 190b may perform the object detection to determine regions of the video frame that have a high likelihood of matching the particular object. In one example, the types of object(s) to match against (e.g., reference objects) may be customized using an open operand stack (enabling programmability of the processor 102 to implement various artificial neural networks defined by directed acyclic graphs each providing instructions for performing various types of object detection). The CNN module 190b may be configured to perform local masking to the region with the high likelihood of matching the particular object(s) to detect the object.

In some embodiments, the CNN module 190b may determine the position (e.g., 3D coordinates and/or location coordinates) of various features (e.g., the characteristics) of the detected objects. In one example, the location of the arms, legs, chest and/or eyes of a person may be determined using 3D coordinates. One location coordinate on a first axis for a vertical location of the body part in 3D space and another coordinate on a second axis for a horizontal location of the body part in 3D space may be stored. In some embodiments, the distance from the lens 160 may represent one coordinate (e.g., a location coordinate on a third axis) for a depth location of the body part in 3D space. Using the location of various body parts in 3D space, the processor 102 may determine body position, and/or body characteristics of detected people.

The CNN module 190b may be pre-trained (e.g., configured to perform computer vision to detect objects based on the training data received to train the CNN module 190b). For example, the results of training data (e.g., a machine learning model) may be pre-programmed and/or loaded into the processor 102. The CNN module 190b may conduct inferences against the machine learning model (e.g., to perform object detection). The training may comprise determining weight values for each layer of the neural network model. For example, weight values may be determined for each of the layers for feature extraction (e.g., a convolutional layer) and/or for classification (e.g., a fully connected layer). The weight values learned by the CNN module 190b may be varied according to the design criteria of a particular implementation.

The CNN module 190b may implement the feature extraction and/or object detection by performing convolution operations. The convolution operations may be hardware accelerated for fast (e.g., real-time) calculations that may be performed while consuming low power. In some embodiments, the convolution operations performed by the CNN module 190b may be utilized for performing the computer vision operations. In some embodiments, the convolution operations performed by the CNN module 190b may be utilized for any functions performed by the processor 102 that may involve calculating convolution operations (e.g., 3D reconstruction).

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190b may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels (or sub-pixels), the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, vehicles, components of a vehicle, furniture, etc.) in higher layers and the last layer may be a classifier that uses the higher level features.

The CNN module 190b may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190b to extract features from the training data may be varied according to the design criteria of a particular implementation.

Each of the hardware modules 190a-190n may implement a processing resource (or hardware resource or hardware engine). The hardware engines 190a-190n may be operational to perform specific processing tasks. In some configurations, the hardware engines 190a-190n may operate in parallel and independent of each other. In other configurations, the hardware engines 190a-190n may operate collectively among each other to perform allocated tasks. One or more of the hardware engines 190a-190n may be homogenous processing resources (all circuits 190a-190n may have the same capabilities) or heterogeneous processing resources (two or more circuits 190a-190n may have different capabilities).

Figure 4:
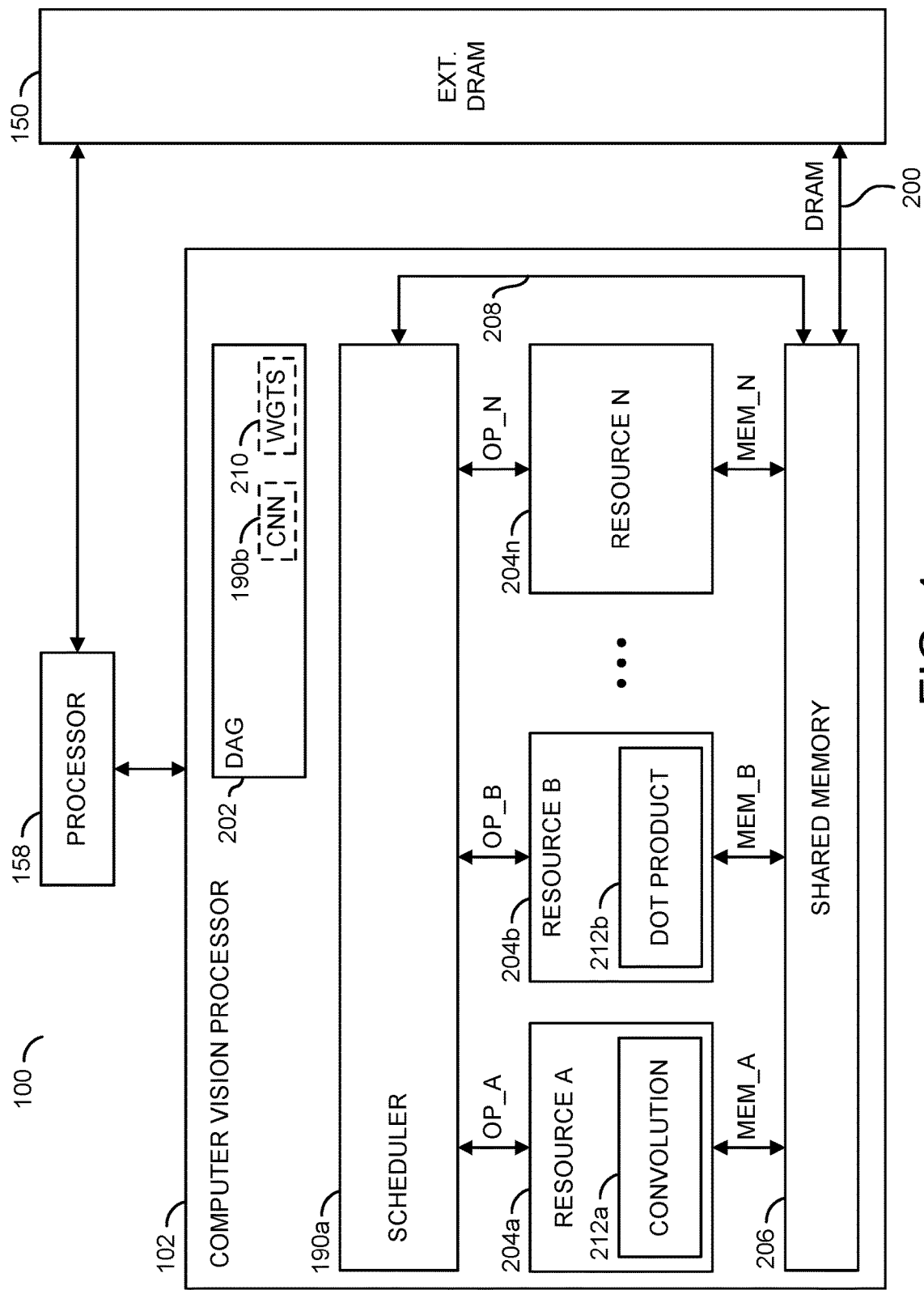
FIG. 4 is a diagram illustrating processing circuitry of a camera system implementing a convolutional neural network configured to perform 3D reconstruction.

Referring to FIG. 4, a diagram illustrating processing circuitry of a camera system implementing a convolutional neural network configured to perform 3D reconstruction is shown. In an example, processing circuitry of the camera system 100 may be configured for applications including, but not limited to autonomous and semi-autonomous vehicles (e.g., cars, trucks, motorcycles, agricultural machinery, drones, airplanes, etc.), manufacturing, and/or security and surveillance systems. In contrast to a general purpose computer, the processing circuitry of the camera system 100 generally comprises hardware circuitry that is optimized to provide a high performance image processing and computer vision pipeline in a minimal area and with minimal power consumption. In an example, various operations used to perform image processing, feature detection/extraction, 3D reconstruction, liveness detection, depth map generation and/or object detection/classification for computer (or machine) vision may be implemented using hardware modules designed to reduce computational complexity and use resources efficiently.

In an example embodiment, the processing circuit 100 may comprise the processor 102, the memory 150, the general purpose processor 158 and/or a memory bus 200. The general purpose processor 158 may implement a first processor. The processor 102 may implement a second processor. In an example, the circuit 102 may implement a computer vision processor. In an example, the processor 102 may be an intelligent vision processor. The memory 150 may implement an external memory (e.g., a memory external to the circuits 158 and 102). In an example, the circuit 150 may be implemented as a dynamic random access memory (DRAM) circuit. The processing circuitry of the camera system 100 may comprise other components (not shown). The number, type and/or arrangement of the components of the processing circuitry of the camera system 100 may be varied according to the design criteria of a particular implementation.

The general purpose processor 158 may be operational to interact with the circuit 102 and the circuit 150 to perform various processing tasks. In an example, the processor 158 may be configured as a controller for the circuit 102. The processor 158 may be configured to execute computer readable instructions. In one example, the computer readable instructions may be stored by the circuit 150. In some embodiments, the computer readable instructions may comprise controller operations. The processor 158 may be configured to communicate with the circuit 102 and/or access results generated by components of the circuit 102. In an example, the processor 158 may be configured to utilize the circuit 102 to perform operations associated with one or more neural network models.

In an example, the processor 102 generally comprises the scheduler circuit 190a, a block (or circuit) 202, one or more blocks (or circuits) 204a-204n, a block (or circuit) 206 and a path 208. The block 202 may implement a directed acyclic graph (DAG) memory. The DAG memory 202 may comprise the CNN module 190b and/or weight/bias values 210. The blocks 204a-204n may implement hardware resources (or engines). The block 206 may implement a shared memory circuit. In an example embodiment, one or more of the circuits 204a-204n may comprise blocks (or circuits) 212a-212n. In the example shown, the circuit 212a and the circuit 212b are implemented as representative examples in the respective hardware engines 204a-204b. One or more of the circuit 202, the circuits 204a-204n and/or the circuit 206 may be an example implementation of the hardware modules 190a-190n shown in association with FIG. 3.

In an example, the processor 158 may be configured to program the circuit 102 with one or more pre-trained artificial neural network models (ANNs) including the convolutional neural network (CNN) 190b having multiple output frames in accordance with embodiments of the invention and weights/kernels (WGTS) 210 utilized by the CNN module 190b. In various embodiments, the CNN module 190b may be configured (trained) for operation in an edge device. In an example, the processing circuitry of the camera system 100 may be coupled to a sensor (e.g., video camera, etc.) configured to generate a data input. The processing circuitry of the camera system 100 may be configured to generate one or more outputs in response to the data input from the sensor based on one or more inferences made by executing the pre-trained CNN module 190b with the weights/kernels (WGTS) 210. The operations performed by the processor 158 may be varied according to the design criteria of a particular implementation.

In various embodiments, the circuit 150 may implement a dynamic random access memory (DRAM) circuit. The circuit 150 is generally operational to store multidimensional arrays of input data elements and various forms of output data elements. The circuit 150 may exchange the input data elements and the output data elements with the processor 158 and the processor 102.

The processor 102 may implement a computer vision processor circuit. In an example, the processor 102 may be configured to implement various functionality used for computer vision. The processor 102 is generally operational to perform specific processing tasks as arranged by the processor 158. In various embodiments, all or portions of the processor 102 may be implemented solely in hardware. The processor 102 may directly execute a data flow directed to execution of the CNN module 190b, and generated by software (e.g., a directed acyclic graph, etc.) that specifies processing (e.g., computer vision, 3D reconstruction, liveness detection, etc.) tasks. In some embodiments, the processor 102 may be a representative example of numerous computer vision processors implemented by the processing circuitry of the camera system 100 and configured to operate together.

In an example, the circuit 212a may implement convolution operations. In another example, the circuit 212b may be configured to provide dot product operations. The convolution and dot product operations may be used to perform computer (or machine) vision tasks (e.g., as part of an object detection process, etc.). In yet another example, one or more of the circuits 204c-204n may comprise blocks (or circuits) 212c-212n (not shown) to provide convolution calculations in multiple dimensions. In still another example, one or more of the circuits 204a-204n may be configured to perform 3D reconstruction tasks.

In an example, the circuit 102 may be configured to receive directed acyclic graphs (DAGs) from the processor 158. The DAGs received from the processor 158 may be stored in the DAG memory 202. The circuit 102 may be configured to execute a DAG for the CNN module 190b using the circuits 190a, 204a-204n, and 206.

Multiple signals (e.g., OP_A-OP_N) may be exchanged between the circuit 190a and the respective circuits 204a-204n. Each of the signals OP_A-OP_N may convey execution operation information and/or yield operation information. Multiple signals (e.g., MEM_A-MEM_N) may be exchanged between the respective circuits 204a-204n and the circuit 206. The signals MEM_A-MEM_N may carry data. A signal (e.g., DRAM) may be exchanged between the circuit 150 and the circuit 206. The signal DRAM may transfer data between the circuits 150 and 190a (e.g., on the transfer path 208).

The scheduler circuit 190a is generally operational to schedule tasks among the circuits 204a-204n to perform a variety of computer vision related tasks as defined by the processor 158. Individual tasks may be allocated by the scheduler circuit 190a to the circuits 204a-204n. The scheduler circuit 190a may allocate the individual tasks in response to parsing the directed acyclic graphs (DAGs) provided by the processor 158. The scheduler circuit 190a may time multiplex the tasks to the circuits 204a-204n based on the availability of the circuits 204a-204n to perform the work.

Each circuit 204a-204n may implement a processing resource (or hardware engine). The hardware engines 204a-204n are generally operational to perform specific processing tasks. The hardware engines 204a-204n may be implemented to include dedicated hardware circuits that are optimized for high-performance and low power consumption while performing the specific processing tasks. In some configurations, the hardware engines 204a-204n may operate in parallel and independent of each other. In other configurations, the hardware engines 204a-204n may operate collectively among each other to perform allocated tasks.

The hardware engines 204a-204n may be homogenous processing resources (e.g., all circuits 204a-204n may have the same capabilities) or heterogeneous processing resources (e.g., two or more circuits 204a-204n may have different capabilities). The hardware engines 204a-204n are generally configured to perform operators that may include, but are not limited to, a resampling operator, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator, an upsample operator and a power of two downsample operator, etc.

In an example, the hardware engines 204a-204n may comprise matrices stored in various memory buffers. The matrices stored in the memory buffers may enable initializing the convolution operator. The convolution operator may be configured to efficiently perform calculations that are repeatedly performed for convolution functions. In an example, the hardware engines 204a-204n implementing the convolution operator may comprise multiple mathematical circuits configured to handle multi-bit input values and operate in parallel. The convolution operator may provide an efficient and versatile solution for computer vision and/or 3D reconstruction by calculating convolutions (also called cross-correlations) using a one-dimensional or higher-dimensional kernel. The convolutions may be useful in computer vision operations such as object detection, object recognition, edge enhancement, image smoothing, etc. Techniques and/or architectures implemented by the invention may be operational to calculate a convolution of an input array with a kernel. Details of the convolution operator may be described in association with U.S. Pat. No. 10,310,768, filed on Jan. 11, 2017, appropriate portions of which are hereby incorporated by reference.

In various embodiments, the hardware engines 204a-204n may be implemented solely as hardware circuits. In some embodiments, the hardware engines 204a-204n may be implemented as generic engines that may be configured through circuit customization and/or software/firmware to operate as special purpose machines (or engines). In some embodiments, the hardware engines 204a-204n may instead be implemented as one or more instances or threads of program code executed on the processor 158 and/or one or more processors 102, including, but not limited to, a vector processor, a central processing unit (CPU), a digital signal processor (DSP), or a graphics processing unit (GPU). In some embodiments, one or more of the hardware engines 204a-204n may be selected for a particular process and/or thread by the scheduler 190a. The scheduler 190a may be configured to assign the hardware engines 204a-204n to particular tasks in response to parsing the directed acyclic graphs stored in the DAG memory 202.

The circuit 206 may implement a shared memory circuit. The shared memory 206 may be configured to store data in response to input requests and/or present data in response to output requests (e.g., requests from the processor 158, the DRAM 150, the scheduler circuit 190a and/or the hardware engines 204a-204n). In an example, the shared memory circuit 206 may implement an on-chip memory for the computer vision processor 102. The shared memory 206 is generally operational to store all of or portions of the multidimensional arrays (or vectors) of input data elements and output data elements generated and/or utilized by the hardware engines 204a-204n. The input data elements may be transferred to the shared memory 206 from the DRAM circuit 150 via the memory bus 200. The output data elements may be sent from the shared memory 206 to the DRAM circuit 150 via the memory bus 200.

The path 208 may implement a transfer path internal to the processor 102. The transfer path 208 is generally operational to move data from the scheduler circuit 190a to the shared memory 206. The transfer path 208 may also be operational to move data from the shared memory 206 to the scheduler circuit 190a.

The processor 158 is shown communicating with the computer vision processor 102. The processor 158 may be configured as a controller for the computer vision processor 102. In some embodiments, the processor 158 may be configured to transfer instructions to the scheduler 190a. For example, the processor 158 may provide one or more directed acyclic graphs to the scheduler 190a via the DAG memory 202. The scheduler 190a may initialize and/or configure the hardware engines 204a-204n in response to parsing the directed acyclic graphs. In some embodiments, the processor 158 may receive status information from the scheduler 190a. For example, the scheduler 190a may provide a status information and/or readiness of outputs from the hardware engines 204a-204n to the processor 158 to enable the processor 158 to determine one or more next instructions to execute and/or decisions to make. In some embodiments, the processor 158 may be configured to communicate with the shared memory 206 (e.g., directly or through the scheduler 190a, which receives data from the shared memory 206 via the path 208). The processor 158 may be configured to retrieve information from the shared memory 206 to make decisions. The instructions performed by the processor 158 in response to information from the computer vision processor 102 may be varied according to the design criteria of a particular implementation.

Figure 5:
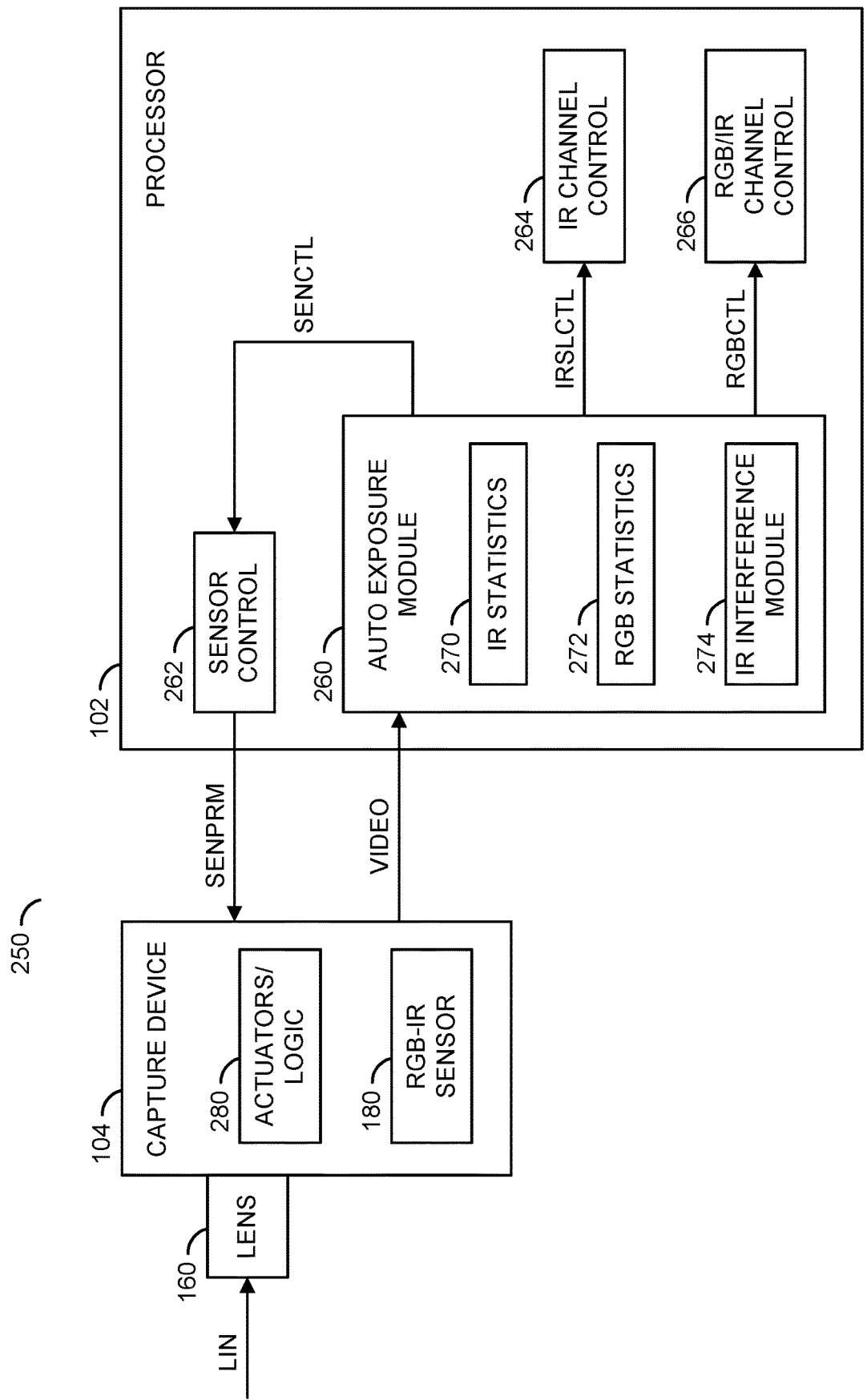
FIG. 5 is a block diagram illustrating an intelligent auto-exposure control system.

Referring to FIG. 5, a block diagram illustrating an intelligent auto-exposure control system is shown. An auto-exposure system 250 is shown. The auto-exposure system 250 may comprise the processor 102 and the capture device 104. The lens 160 is shown receiving the light input LIN. Generally, the intelligent automatic exposure control logic may be implemented by the processor 102.

The processor 102 may comprise a block (or circuit) 260, a block (or circuit) 262, a block (or circuit) 264 and/or a block (or circuit) 266. The circuit 260 may implement an auto-exposure module (e.g., an AE module). The circuit 262 may implement sensor control logic. The circuit 264 may implement IR channel control logic. The circuit 266 may implement RGB/IR channel control logic. The processor 102 may comprise other components (not shown). The number, type and/or arrangement of the components of the processor 102 for performing the intelligent automatic exposure control may be varied according to the design criteria of a particular implementation.

The AE module 260 may communicate a signal (e.g., SENCTL) to the sensor control logic 262. The AE module 260 may communicate a signal (e.g., IRSLCTL) to the IR channel control logic 264. The AE module 260 may communicate a signal (e.g., RGBCTL) to the RGB/IR channel control logic 266. Other communication signals may be communicated between the AE module 260, the sensor control logic 262, the IR channel control logic 264 and/or the RGB/IR channel control logic 266 (not shown). The data communicated between the various components of the processor 102 may be varied according to the design criteria of a particular implementation.

The AE module 260 may be configured to enable the RGB-IR sensor 180 to have consistent performance at various light conditions. The AE module 260 may provide adjustments for the sensor control logic 262, the IR channel control logic 264 and/or the RGB/IR channel control logic 266 depending on the visible light and/or IR light in the environment. The adjustments provided by the AE module 260 may help overcomes the physical limitations of RGB-IR sensor 180.

The AE module 260 may be configured to provide and/or adjust individual control parameters for the sensor settings for the RGB-IR sensor 180, an IR image channel and/or an RGB image channel. The AE module 260 may be configured to determine parameters for and provide the signal SENCTL to enable the sensor control logic 262 to adjust the control parameters for the RGB-IR sensor 180. The AE module 260 may be configured to determine parameters for and provide the signal IRSLCTL to enable the IR channel control logic 264 to adjust parameters for the IR image channel. The AE module 260 may be configured to determine parameters for and provide the signal RGBCTL to enable the RGB/IR channel control logic 266 to adjust parameters for the RGB image channel. The individual adjustments determined by the AE module 260 may enable the apparatus 100 to dynamically react to environmental conditions to ensure a consistent quality of images generated. For example, the AE module 260 may determine parameters and/or modes of operation for selecting parameters for the various control modules (e.g., the sensor control logic 262, the IR channel control logic 264 and the RGB/IR channel control logic 266) to enable tuning that may provide a similar brightness of images generated under different visible light and IR light conditions.

The AE module 260 may be configured to compensate for varying amounts of IR interference in the environment. The AE module 260 may be configured to select between two or more modes of operation in order to overcome IR sensitivity to interference. The AE module 260 may select between a Digital Gain First mode of operation and a Shutter First mode of operation. The AE module 260 may further receive a user input (e.g., an aggressiveness value) that may affect the various modes of operation.

The sensor control logic 262 may be configured to receive the signal SENCTL and generate a signal (e.g., SENPRM). The signal SENPRM may be communicated to the capture device 104. The sensor control logic 262 may be configured to adjust physical characteristics of the operation of the capture device 104. In an example, the sensor control logic 262 may be configured to control a DC iris for the lens 160, an exposure time for the RGB-IR sensor 180, a shutter time for the lens 160, etc. The sensor control logic 262 may be configured to adjust at least three factors, the iris (or aperture), an exposure time, and/or an analog gain control (AGC). The AGC may be used to amplify the electrical signal of the RAW input data.

Since the response of the RGB-IR sensor 180 to the light input LIN may affect the physical characteristics received as input for the apparatus 100, adjustments made by the sensor control logic 262 may affect the input received by the RGB image channel and the IR image channel. In an example, a longer exposure time may enable a larger exposure area of the structured light pattern SLP, which may provide a larger area of a depth map to be generated from images in the IR image channel. However, a longer exposure time may also over-expose images in the RGB image channel. For example, the sensor control logic 262 may be shared for each of the image channels implemented by the processor 102. The sensor control logic 262 may be one source of adjustments that may be controlled by the AE module 260.

The IR channel control logic 264 may be configured to receive the signal IRSLCTL. The IR channel control logic 264 may be configured to generate a signal (not shown) that may be configured to adjust characteristics of the images in the IR image channel with structured light. In an example, the characteristics adjusted by the IR channel control logic 264 may be postprocessing adjustments such as digital gain and tone curve adjustments. The signal IRSLCTL may be configured to dynamically and individually control the pixel data in the IR image channel (with structured light).

The IR channel control logic 264 may be configured to provide adjustments for the IR images generated that have captured the structured light pattern SLP. For example, when the timing signal SL_TRIG toggles on the structured light pattern SLP, the IR images captured may comprise the fill light dot pattern projected by the structured light pattern SLP. The IR image channel with structured light may be adjusted using the IR channel control logic 264. For example, since the IR image channel may be sensitive to IR interferences, in order to provide the consistent brightness, the IR channel control logic 264 may provide the individual adjustments for the IR images that comprise the structured light pattern SLP.

The RGB/IR channel control logic 266 may be configured to receive the signal RGBCTL. The RGB/IR channel control logic 266 may be configured to generate a signal (not shown) that may be configured to adjust characteristics of the images in the IR image channel without structured light and the RGB image channel. In an example, the characteristics adjusted by the RGB/IR channel control logic 266 may be postprocessing adjustments such as digital gain and tone curve adjustments. The signal RGBCTL may be configured to dynamically and individually control the pixel data in the IR image channel (without structured light) and the RGB image channel.

The RGB/IR channel control logic 266 may be configured to provide adjustments for the RGB images. The RGB/IR channel control logic 266 may be configured to provide adjustments for the IR images generated that do not have the structured light pattern SLP. For example, when the timing signal SL_TRIG toggles off the structured light pattern SLP, the IR images captured may not comprise the dot pattern projected by the structured light pattern SLP. The IR image channel without the structured light may be adjusted using the RGB/IR channel control logic 266. For example, since the IR image channel without the structured light pattern may not be affected by the IR interferences, in order to provide the consistent brightness, the RGB/IR channel control logic 266 may provide the individual adjustments for the IR images that do not comprise the structured light pattern SLP and the RGB images.

The sensor control logic 262, the IR channel control logic 264 and the RGB/IR channel control logic 266 may enable each of the image channels to be adjusted. For example, the IR channel (with structured light) may be very sensitive to the IR interferences. A small amount of infrared light from an external source (e.g., sunlight) may result in an overexposed IR image. In another example, if the shutter value is reduced to prevent the IR interference, the RGB image channel may be underexposed when the shutter value is small. The individual channel control implemented by the apparatus 100 may enable the RGB images and the IR images to be tuned to a similar brightness even under different visible light and IR light conditions.

The AE module 260 may comprise a block (or circuit) 270, a block (or circuit) 272 and/or a block (or circuit) 274. The circuit 270 may implement IR statistics. The circuit 272 may implement RGB statistics. The circuit 274 may implement an IR interference module. The AE module 260 may comprise other components (not shown). The number, type and/or arrangement of the components of the AE module 260 may be varied according to the design criteria of a particular implementation.

The IR statistics 270 may be configured to extract information about the IR images. In an example, the AE module 260 may be configured to receive the IR images and analyze various parameters about the IR images. The IR statistics 270 may be used to determine the various parameters to adjust for the IR channel control logic 264. The AE module 260 may be configured to generate the signal IRSLCTL in response to the data extracted by the IR statistics 270.

The RGB statistics 272 may be configured to extract information about the RGB images. In an example, the AE module 260 may be configured to receive the RGB images (e.g., visible light images) and analyze various parameters about the RGB images. The RGB statistics 272 may be used to determine the various parameters to adjust for the RGB/IR channel control logic 266. The AE module 260 may be configured to generate the signal RGBCTL in response to the data extracted by the RGB statistics 272.

The IR interference module 274 may be configured to detect an amount of IR interference in the environment. The IR interference module 274 may be configured to determine which mode of operation the AE module 260 should operate in based on the amount of IR interference detected. In an example, the IR interference module 274 may be configured to change the AE module 260 between the Shutter First mode of operation and the Digital Gain First mode of operation. The mode of operation selected by the IR interference module 274 may affect the parameters presented in the signal SENCTL, the signal IRSLCTL and/or the signal RGBCTL. Details of the IR interference module 274 may be described in association with FIG. 7.

The capture device 104 may be configured to present the signal VIDEO to the processor 102. The signal VIDEO may comprise the pixel data captured by the RGB-IR sensor 180. In an example, the signal VIDEO may comprise the electrical signal of the RAW input data from the RGB-IR sensor 180. The processor 102 may be configured to arrange the pixel data as video frames. The video frames may be analyzed the AE module 260.

The processor 102 may be configured to present the signal SENPRM to the capture device 104. The signal SENPRM may be generated by the sensor control logic 262. The capture device 104 may be configured to adjust a physical operation of the lens 160 and/or the RGB-IR sensor 180 in response to the signal SENPRM.

The capture device 104 is shown comprising a block (or circuit) 280. The circuit 280 may implement actuators and/or control logic. The actuators/control logic 280 may be configured to adjust the physical operation of the capture device 104. For example, the actuators/control logic 280 may perform adjustments in response to the signal SENPRM. The operation and/or functionality of other components of the capture device 104 (e.g., the RGB-IR sensor 180, the processor/logic 182 and/or the frame buffer 184) may be adjusted in response to the signal SENPRM. In an example, the actuators/control logic 280 may be configured to adjust a DC iris, an AGC, a focus, a zoom, a tilt and/or a pan of the capture device 104. For example, the amount of the light input LIN that reaches the RGB-IR sensor 180 and/or the length of time that the light input LIN is applied to the RGB-IR sensor 180 may be adjusted in response to the signal SENPRM.

A physical constraint of the RGB-IR sensor 180 may be that the same RGB-IR sensor 180 provides the pixel data for the RGB images and the IR images simultaneously. Since the pixel data for the RGB images and the IR images are captured simultaneously, the sensor control parameters generated by the sensor control logic 262 may affect both the pixel data from the RGB images and the IR images. Tuning the sensor control parameters alone may not overcome the physical constraints of the RGB-IR sensor 180 to balance the brightness of the RGB image channel and the IR image channel under various light conditions. The AE module 260 may be configured to individually tune the IR channel control logic 264 and/or the RGB/IR channel control logic 266 in order to provide additional tuning that may overcome the physical constraints of the RGB-IR sensor 180. For example, the sensor control logic 262 may provide one layer of adjustment (e.g., to affect the light input LIN for the RGB-IR sensor 180), and the IR channel control logic 264 and the RGB/IR channel control logic 266 may provide additional layers of adjustment (e.g., post-processing that may individually tune the video frames in the RGB channel, the IR channel (without structured light) and the IR channel (with structured light)).

Figure 6:
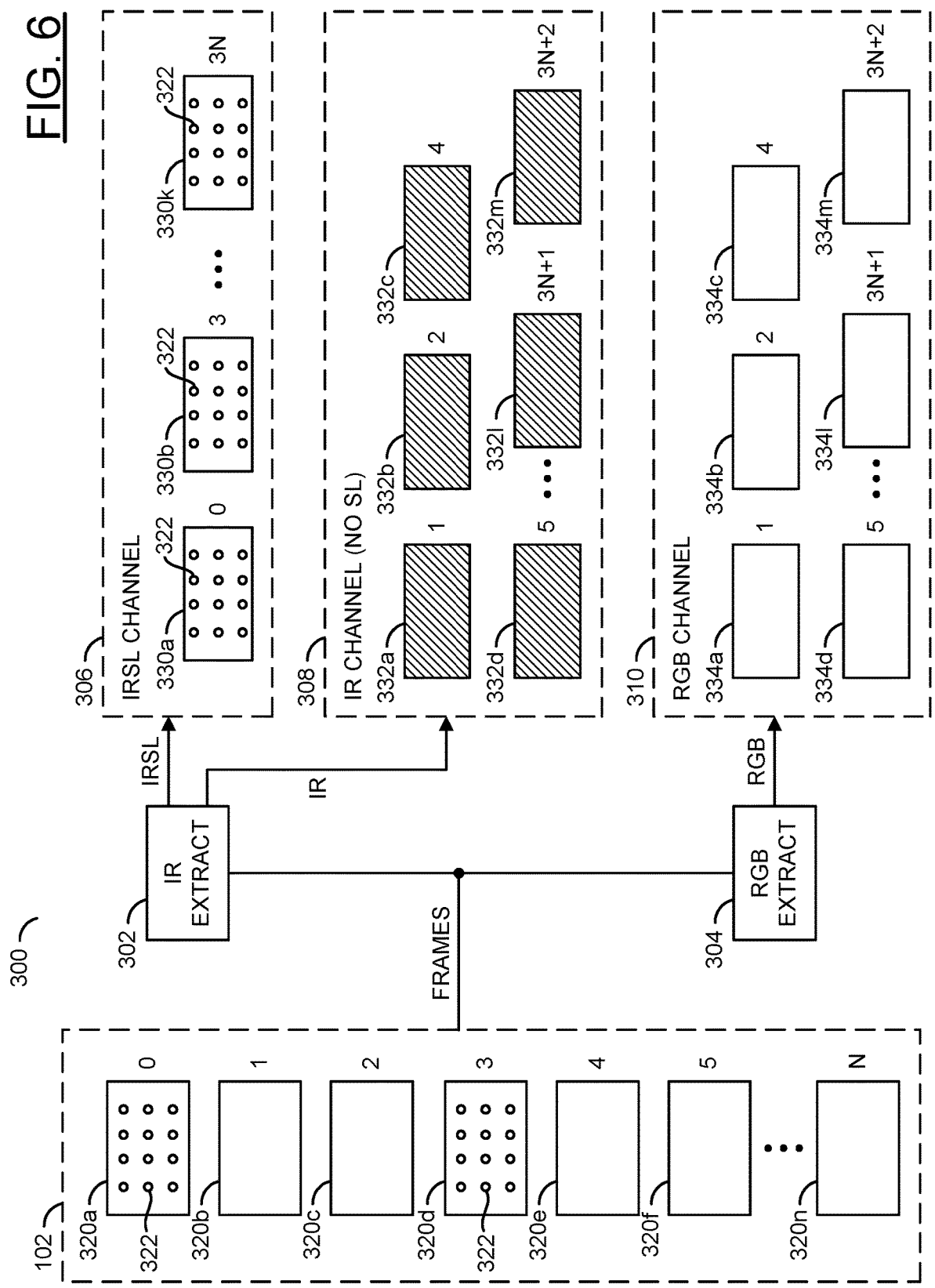
FIG. 6 is a diagram illustrating a processor configured to extract IR video frames with a structured light pattern, IR video frames without a structured light pattern and RGB video frames.

Referring to FIG. 6, a diagram illustrating a processor configured to extract IR video frames with a structured light pattern, IR video frames without a structured light pattern and RGB video frames is shown. An example RGB/IR dispatch 300 is shown. The example RGB/IR dispatch 300 may illustrate extracting RGB video frames and IR video frames from the video frames generated by the processor 102. The example RGB/IR dispatch 300 may comprise the processor 102, a block (or circuit) 302, a block (or circuit) 304, a block (or circuit) 306, a block (or circuit) 308 and/or a block (or circuit) 310. The circuit 302 may implement an IR extraction module. The circuit 304 may implement an RGB extraction module. The block 306 may represent an IR structured light image channel (e.g., an IRSL image channel). The block 308 may represent an IR image channel without structured light (e.g., an IR image channel). The block 310 may represent an RGB image channel. The example RGB/IR dispatch 300 may comprise other components (not shown). The number, type and/or arrangement of the components of the RGB/IR dispatch 300 may be varied according to the design criteria of a particular implementation.

The processor 102 may comprise video frames 320a-320n. The video frames 320a-320n may comprise pixel data received from the signal VIDEO presented by the capture device 104. The processor 102 may be configured to generate the video frames 320a-320n arranged from the pixel data. While the video frames 320a-320n are shown within the processor 102, each of the IR extraction module 302, the RGB extraction module 304, the IRSL image channel 306, the IR image channel 308 and/or the RGB image channel 310 may be implemented within the processor 102 and/or the CNN module 190b. The circuits 302-310 may be implemented as discrete hardware modules and/or combinations of the hardware engines 204a-204n combined to perform a particular task. The circuits 302-310 may be conceptual blocks illustrative of various techniques implemented by the processor 102 and/or the CNN module 190b.

The processor 102 may be configured to receive the signal VIDEO. The signal VIDEO may comprise the RGB-IR pixel data generated by the RGB-IR image sensor 180. The pixel data may comprise information captured of the environment and/or objects near the capture device 104 along with the structured light pattern SLP projected onto the environment and/or objects. Whether the pixel data in the signal VIDEO comprises the structured light pattern SLP may depend on whether the structured light pattern SLP is currently active. The structured light pattern SLP may be toggled between on and off in response to the timing signal SL_TRIG. The processor 102 may generate a signal (e.g., FRAMES). The signal FRAMES may comprise the video frames 320a-320n. The processor 102 may be configured to process the pixel data arranged as the video frames 320a-320n that may comprise the structured light pattern SLP. In some embodiments, the video frames 320a-320n may be presented to (e.g., processed internally by the processor 102 using) the CNN module 190b. The processor 102 may be capable of performing other operations using the video frames 320a-320n (e.g., generate encoded video frames for display, packetize the video frames 320a-320n for communication using the communication module 154, etc.).

In the example shown, the video frames 320a-320n may be generated with the structured light projector 106 generating the structured light pattern SLP in one third of the input frames. For example, the timing signal SL_TRIG may be configured to toggle the structured light pattern SLP on for one of the video frames 320a-320n, then toggle the structured light pattern SLP off for the next two of the video frames 320a-320n, then toggle the structured light pattern SLP on for the next one of the video frames 320a-320n, etc. Details about generating the structured light pattern SLP and/or the timing for generating the structured light pattern SLP using the timing signal SL_TRIG may be described in association with U.S. application Ser. No. 16/860,648, filed on Apr. 28, 2020, appropriate portions of which are incorporated by reference. Dots 322 are shown in the video frame 320a and the video frame 320d (e.g., every third video frame) as an illustrative example of the structured light pattern SLP. While the dots 322 are shown with a same pattern for illustrative purposes, the dot pattern may be different for each of the video frames 320a-320n that capture the structured light pattern SLP (e.g., depending on the objects that the structured light pattern SLP are projected onto when the image is captured). With the structured light pattern SLP timed to be projected in one third of the input frames, the dot pattern 322 may be captured in every third of the video frames 320a-320n. While a one third structured light pattern projection timing is shown, the apparatus 100 may be implemented with other rules to dispatch and/or extract the IR images and the RGB images from the video frames 320a-320n.

The signal FRAMES comprising the video frames 320a-320n may be presented to the IR extraction module 302 and the RGB extraction module 304. The IR extraction module 302 and the RGB extraction module 304 may be configured to extract appropriate content from the video frames 320a-320n for the subsequent modules implemented by the processor 102. In the example shown, the IR extraction module 302 and the RGB extraction module 304 may extract the appropriate content from the video frames 320a-320n for the IRSL image channel 306, the IR image channel 308 and the RGB image channel 310.

The IR extraction module 302 may receive the video frames 320a-320n. The IR extraction module 302 may be configured to extract the IR data (or the IR video frames) from the RGB-IR video frames 320a-320n. The IR extraction module 302 may be configured to generate a signal (e.g., IRSL) and a signal (e.g., IR). The signal IRSL may comprise the IR channel data extracted from the video frames 320a-320n while the structured light pattern SLP is toggled on. The signal IR may comprise the IR channel data extracted from the video frames 320a-320n while the structured light pattern SLP is toggled off. The signal IRSL may comprise the structured light pattern SLP. The signal IR may not comprise the structured light pattern SLP. The signal IRSL and the signal IR may both comprise full resolution IR images. The signal IRSL may be presented to the IRSL image channel 306. The signal IRSL may communicate the IRSL image channel 306 (e.g., the IR subset of the video frames 320a-320n with the structured light pattern SLP active). The signal IR may be presented to the IR image channel 308. The signal IR may communicate the IR image channel 308 (e.g., the IR subset of the video frames 320a-320n with the structured light pattern SLP inactive).

The RGB extraction module 304 may receive the video frames 320a-320n. The RGB extraction module 304 may be configured to extract the RGB data (or the RGB video frames) from the RGB-IR video frames 320a-320n. The RGB extraction module 304 may be configured to generate a signal (e.g., RGB). The signal RGB may comprise the RGB channel data extracted from the video frames 320a-320n. The signal RGB may comprise the RGB information (e.g., visible light data) without the structured light pattern SLP. The signal RGB may be presented to the RGB image channel 310. The signal RGB may communicate the RGB image channel 310 (e.g., the RGB subset of the video frames 320a-320n).

The IRSL image channel 306 may comprise IRSL images 330a-330k. The IRSL images 330a-330k may each comprise the dot pattern 322. The IRSL images 330a-330k may each comprise a full resolution IR image with the structured light pattern SLP active. The IRSL image 330a may correspond to (e.g., have the same dot pattern 322 as) the video frame 320a and the IRSL image 330b may correspond to the video frame 320d. Since the structured light pattern SLP is projected and captured for a subset of the video frames 320a-320n, the IRSL image channel 306 may comprise fewer of the IRSL images 330a-330k than the total number of the video frames 320a-320n generated. In the example shown, the IRSL image channel 306 may comprise every third one of the video frames 320a-320n.

The structured light pattern SLP may be exposed on the IRSL channel data. The IRSL data may be extracted by the IR extraction module 302 from the output of the RGB-IR sensor 180. The IRSL images 330a-330k may be formatted into an IR YUV image. The IRSL images 330a-330k comprising the dot patterns 322 in the IR YUV image format may be presented to the AE module 260 and/or other components of the processor 102.

The IR image channel 308 may comprise IR images 332a-332m. The IR images 332a-332m may not comprise the dot pattern 322. For example, the structured light projector 106 may be timed to be turned off during the capture of the IR images 332a-332m. The IR images 332a-332m may each comprise a full resolution IR image with the structured light pattern SLP inactive. The IR image 332a may correspond to (e.g., have the same IR pixel data as) the video frame 320b, the IR image 332b may correspond to the video frame 320c, the IR image 332c may correspond to the video frame 320e, the IR image 332d may correspond to the video frame 320f, etc. Since the structured light pattern SLP is projected and captured for a subset of the video frames 320a-320n (e.g., the IRSL images 330a-330k) and is off for another subset of the video frames 320a-320n (e.g., the IR images 332a-332m), the IR image channel 308 may comprise fewer of the IR images 332a-332m than the total number of the video frames 320a-320n generated, but more than the total number of the IRSL images 330a-330k.

The structured light pattern SLP may be toggled off for IR channel data. The IR data may be extracted by the IR extraction module 302 from the output of the RGB-IR sensor 180. The IR images 332a-332m may be formatted into an IR YUV image. The IR images 332a-332m in the IR YUV image format without the structured light pattern SLP may be presented to the AE module 260 and/or other components of the processor 102.

The RGB image channel 310 may comprise RGB images 334a-334m. The RGB images 334a-334m may not comprise the dot pattern 322. For example, the structured light projector 106 may be timed to be turned off during the capture of the RGB images 334a-334m. The RGB images 334a-334m may each comprise a full resolution RGB image with the structured light pattern SLP inactive. The RGB image 334a may correspond to (e.g., have the same RGB pixel data as) the video frame 320b, the RGB image 334b may correspond to the video frame 320c, the RGB image 334c may correspond to the video frame 320e, the RGB image 334d may correspond to the video frame 320f, etc. Since the structured light pattern SLP is projected and captured for a subset of the video frames 320a-320n (e.g., the IRSL images 330a-330k) and is off for another subset of the video frames 320a-320n (e.g., the RGB images 334a-334m), the RGB image channel 310 may comprise fewer of the RGB images 334a-334m than the total number of the video frames 320a-320n generated, but more than the total number of the IRSL images 330a-330k.

The RGB data may be extracted by the RGB extraction module 304 from the output of the RGB-IR sensor 180. The RGB images 334a-334m may be formatted into an RGB image format. The RGB images 334a-334m may be presented to the AE module 260 and/or other components of the processor 102.

The IRSL image channel 306, the IR image channel 308 and the RGB image channel 310 may implement three distinct virtual channels from the RAW images 320a-320n. Since the structured light pattern SLP is toggled off more often than toggled on, the IRSL image channel 306 may comprise fewer of the IRSL images 330a-330k than the IR images 332a-332m or the RGB images 334a-334m. For example, the IR image channel 308 and the RGB image channel 310 may comprise the same frame number, but different image content (e.g., IR light data and visible light data, respectively).

The data from the IRSL image channel 306, the IR image channel 308 and/or the RGB image channel 310 may be useful for various functionality of the apparatus 100, the processor 102 and/or the CNN module 190b. In an example, the various subsets of data in the image channels 306-310 may be usable for 3D reconstruction and/or depth map generation. In another example, the various subsets of data in the image channels 306-310 may be usable for generating statistics for performing the intelligent auto-exposure. In yet another example, the various subsets of data in the image channels 306-310 may be usable for generating output video (e.g., the signal VIDOUT) for a display. In still another example, the various subsets of data in the image channels 306-310 may be usable for detecting objects, classifying objects and/or analyzing characteristics of objects. The usage scenario for data provided by the various subsets of data in the image channels 306-310 may be varied according to the design criteria of a particular implementation.

Figure 7:
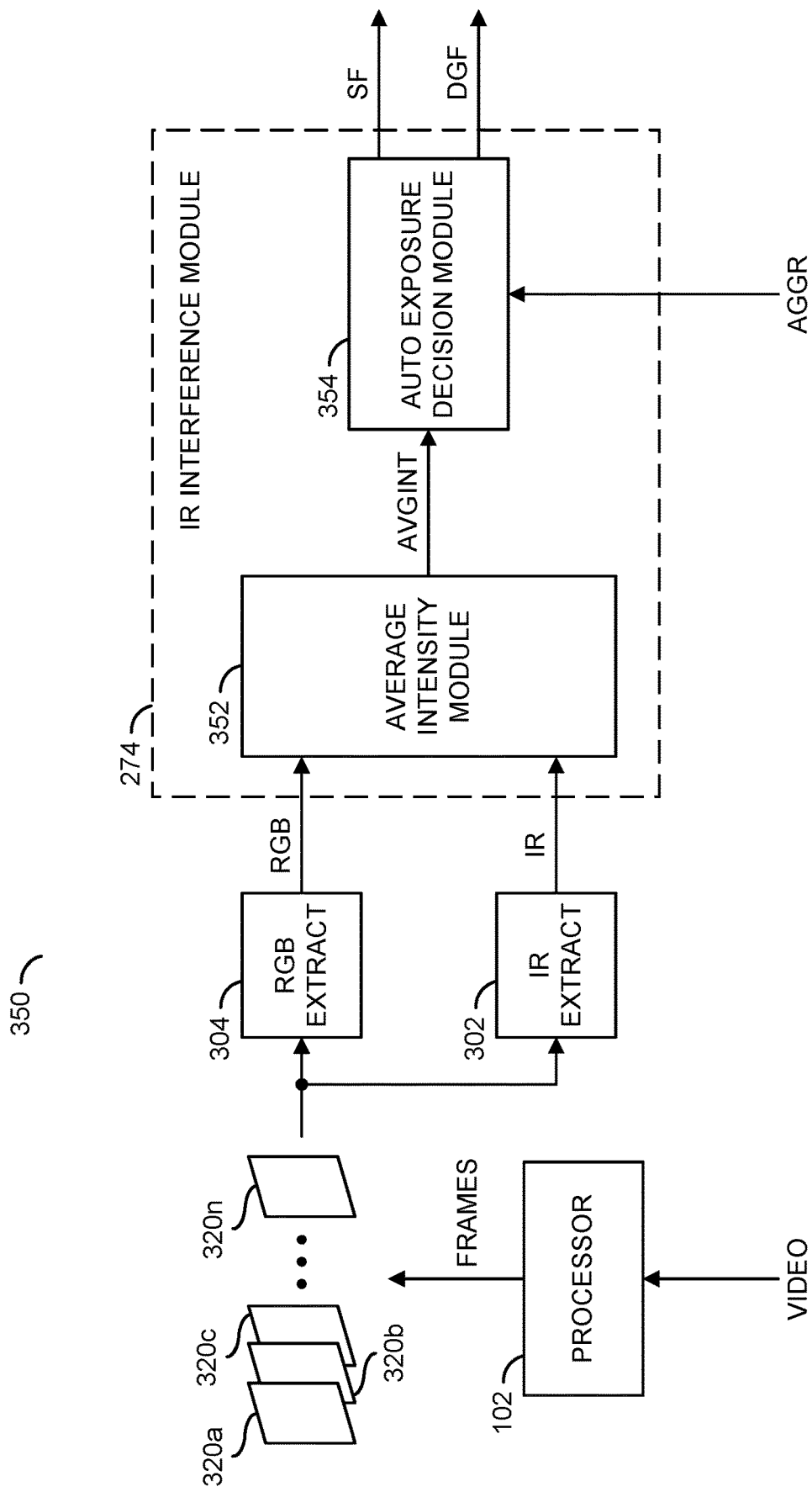
FIG. 7 is a block diagram illustrating an IR interference module configured to determine an amount of IR interference in the environment.

Referring to FIG. 7, a block diagram illustrating an IR interference module configured to determine an amount of IR interference in the environment is shown. IR interference components 350 are shown. The IR interference components 350 may comprise various hardware, conceptual blocks, inputs and/or outputs that may be used by the apparatus 100 to perform the IR interference measurement. The IR interference measurement may be used to select between the Shutter First mode of operation and the Digital Gain First mode of operation. The IR interference components 350 may be represented as a block diagram that illustrates the operations performed by the apparatus 100 to select the mode of operation for providing the consistent brightness output for the various channels 306-310.

The IR interference components 350 may comprise the processor 102, the video frames 320a-320n, the IR extraction module 302, the RGB extraction module 304 and/or the IR interference module 274. The processor 102, the IR extraction module 302, the RGB extraction module 304 and the IR interference module 274 are shown as separate components for illustrative purposes. However, the IR extraction module 302, the RGB extraction module 304 and/or the IR interference module 274 may be a component implemented by the processor 102. The IR interference module 274 may be a component of the AE module 260 (not shown).

The processor 102 may be configured to receive the signal VIDEO. The signal VIDEO may comprise the RGB-IR pixel data generated by the image sensor 180. The processor 102 may generate the signal FRAMES that may comprise the video frames 320a-320n. The processor 102 may be configured to process the pixel data arranged as the video frames 320a-320n that may comprise the structured light pattern SLP (depending on whether the timing signal SL_TRIG has toggled on the structured light projector 106). The video frames 320a-320n may be presented to (e.g., processed internally by the processor 102 using) the IR extraction module 302 and the RGB extraction module 304.

The IR interference module 274 may be configured to receive the signal RGB (e.g., the data from the RGB image channel 310), the signal IR (e.g., the data from the IR image channel 308) and/or a signal (e.g., AGGR). The IR interference module 274 may be configured to output a signal (e.g., SF) and/or a signal (e.g., DGF). While the IR extraction module 302 may generate the data for the IRSL image channel 306, the IR images with structured light 330a-330k may not be used for measuring the amount of IR interference in the environment. The IR interference module 274 may measure the amount of IR interference in the environment using the visible light data (e.g., the RGB images 334a-334m) and the infrared light data without the structured light pattern SLP (e.g., the IR images 332a-332m). The IR interference module 274 may send or receive other data (not shown). The number of inputs/outputs and/or the type of data communicated by the IR interference module 274 may be varied according to the design criteria of a particular implementation.

The signal AGGR may be an aggressiveness value. The signal AGGR may be a configurable value. In one example, the signal AGGR may be a user input value. For example, the signal AGGR may be input to the IR interference module 274 using the HID 166. In another example, the signal AGGR may be a preconfigured value (e.g., stored in advance in the memory 150). The signal AGGR may provide a percentage value from 0% to 100%. The percentage value of the signal AGGR may provide a setting for a division or ratio of an amount of shutter adjustment for the capture device 104 that may be applied for the intelligent auto-exposure. For example, the signal AGGR may provide a user input to provide a customized balance between an amount of shutter control and an amount of digital gain to use for the auto-exposure adjustment. The signal AGGR may enable the user input to be applied in either the Digital Gain First mode of operation and/or the Shutter First mode of operation.

The signal SF and the signal DGF may be selections by the IR interference module 274 for the mode of operation for the AE module 260. The IR interference module 274 may select either the signal SF for the Shutter First mode of operation or the signal DGF for the Digital Gain first mode of operation. The selection of providing the signal SF or the signal DGF may depend on the amount of IR interference detected by the IR interference module 274.

In response to the signal DGF generated by the IR interference module 274, the AE module 260 may operate in the Digital Gain First mode of operation. In the Digital Gain First mode of operation, the AE module 260 may generate the signal SENCTL, the signal IRSLCTL and/or the signal RGBCTL that may provide parameters to keeps the shutter time of the capture device 104 to a low value (e.g., depending on the aggressiveness value in the signal AGGR) and enable digital gain to increase the image brightness first. In the Digital Gain First mode of operation, the IR image channel 308 may have a reduced effect from the IR interference, while the IR fill light (e.g., the structured light pattern SLP) may have a high output power that may still get exposed in the IRSL image channel 306. In the Digital Gain First mode of operation, the RGB images 334a-334m may appear dark, but the RGB/IR channel control logic 266 may apply digital gain and/or tone curve adjustments to enhance the brightness for the RGB image channel 310. In an example, sunlight may provide intense infrared light that may overexpose the IRSL images 330a-330k and/or the IR images 332a-332m. The Digital Gain First mode of operation may be selected in a high IR interference environment.

The digital gain may have a maximum value. In an example, the maximum digital gain may be a user defined limitation (e.g., a limitation based on an amount of digital gain that may result in unnatural looking video frames, video frames that do not provide sufficient depth data for liveness detection and/or video frames that do not provide accurate color representation for computer vision operations). In the Digital Gain First mode of operation, the digital gain may be increased until the maximum digital gain value is reached. After the maximum digital gain value is reached, the AE module 260 may adjust the signal SENCTL to enable shutter time to be increased. The Digital Gain First mode of operation may prefer performing the adjustments to increase the digital gain and/or tone mapping first, and then increase shutter time later (if determined to be beneficial based on the IR statistics 270 and/or the RGB statistics 272).

In response to the signal SF generated by the IR interference module 274, the AE module 260 may operate in the Shutter First mode of operation. In the Shutter First mode of operation, the AE module 260 may generate the signal SENCTL, the signal IRSLCTL and/or the signal RGBCTL that may provide parameters to keeps the shutter time of the capture device 104 to a high value (e.g., depending on the aggressiveness value in the signal AGGR) to increase the brightness of the images generated. Increasing the shutter time may enable more lines of the RGB-IR sensor 190 to be exposed for the IR fill light (e.g., the structured light pattern SLP). Enabling a longer exposure time in the Shutter First mode of operation may provide a larger exposure area for the structured light pattern SLP. With a larger exposure area for the IRSL image channel 306, a larger area of depth may be generated (which may provide a larger area to cover an object to determine depth. However, increasing the exposure time may result in an overexposure of the RGB images 334a-334m in the RGB image channel 310, which may be corrected by the RGB/IR channel control logic 266. The Shutter First mode of operation may be selected in a low IR interference environment.

The shutter time may have a maximum value. In an example, the maximum shutter time may be a physical limitation of the capture device 104 and/or the RGB-IR sensor 180. In the Shutter First mode of operation, the shutter time may be increased until the maximum shutter time value is reached. After the maximum shutter time value is reached, the AE module 260 may adjust the signal IRSLCTL and the signal RGBCTL to enable the IR channel control logic 264 and/or the RGB/IR channel control logic 266 to change digital gain and tone mapping. The Shutter First mode of operation may prefer performing the adjustments to increase the shutter time first, and then perform digital adjustments later (if determined to be beneficial based on the IR statistics 270 and/or the RGB statistics 272).

The IR interference module 274 may comprise a block (or circuit) 352 and/or a block (or circuit) 354. The circuit 352 may implement an average intensity module. The circuit 354 may implement an auto-exposure decision module. The IR interference module 274 may comprise other components (not shown). The circuits 352-354 may be implemented as discrete hardware modules and/or combinations of the hardware engines 204a-204n combined to perform a particular task. The circuits 352-354 may be conceptual blocks illustrative of various techniques implemented by the processor 102 and/or the CNN module 190b. The number, type and/or arrangement of the components of the IR interference module 274 may be varied according to the design criteria of a particular implementation.

The average intensity module 352 may be configured to receive the signal RGB and the signal IR. The average intensity module 352 may generate a signal (e.g., AVGINT) in response to the signal RGB and the signal IR. The auto-exposure decision module 354 may receive the signal AVGINT and the signal AGGR. The auto-exposure decision module 354 may generate either the signal SF or the signal DGF in response to the signal AVGINT and/or the signal AGGR.

The average intensity module 352 may be configured to calculate an average intensity (e.g., amount of brightness) of two images. The average intensity may be determined based on a luma component of the IR images 332a-332m in the IR image channel 308 and the RGB images 334a-334m in the RGB image channel 310. The signal AVGINT may output the average intensity measured by the average intensity module 352. The average intensity module 352 may be configured to compare one of the IR images (without structured light) 332a-332m to one of the RGB images 334a-334m. Since the IR images 332a-332m and the RGB images 334a-334m are captured simultaneously (e.g., when the structured light pattern SLP is toggled off), the conditions in the environment may be identical in the IR images 332a-332m and the RGB images 334a-334m. The average intensity module 352 may be configured to perform a division operation using an intensity of the RGB images 334a-334m and the intensity of the corresponding IR images 332a-332m to determine the average intensity. In an example, the average intensity may be determined by dividing the intensity of one of the IR images 332a-332m by the intensity of a corresponding one of the RGB images 334a-334m. The average intensity may be used to determine the amount of IR interference in the environment. The result of the division may be presented as the signal AVGINT.

The auto-exposure decision module 354 may be configured to analyze the average intensity calculated by the average intensity module 352. In an example, the auto-exposure decision module 354 may be configured to execute computer readable instructions for selecting between the Digital Gain First mode of operation and the Signal First mode of operation. In one example, the computer readable instructions may be stored by the memory 150. The auto-exposure decision module 354 may be configured to receive the signal AVGINT and compare the average intensity value with a predetermined threshold. In one example, if the average intensity value exceeds the predetermined threshold, then the auto-exposure decision module 354 may determine that the IR interference is high. When the IR interference is determined to be high, the auto-exposure decision module 354 may select the Digital Gain First mode of operation (e.g., the signal DGF may be generated). When the IR interference is determined to be low, the auto-exposure decision module 354 may select the Shutter First mode of operation (e.g., the signal SF may be generated).

The predetermined threshold may be determined based on a calibration of the apparatus 100. Various factors may affect the selection of the predetermined threshold value. In one example, some of the factors that may be analyzed for calibrating the predetermined threshold value for the IR interference module 274 may be an energy intensity of the structured light projector 106, a maximum duty cycle of the structured light projector 106 and/or the maximum time duration of the SLP source 186. In another example, some of the factors that may be analyzed for calibrating the predetermined threshold value may be a sensitivity of the RGB channels of the RGB-IR sensor 180. In yet another example, some of the factors that may be analyzed for calibrating the predetermined threshold value may be a sensitivity of the IR channels of the RGB-IR sensor 180. When the average intensity of one of the IR images 332a-332m is higher than the average intensity of one of the RGB images 334a-334m (e.g., IR/RGB>=threshold value), then the auto-exposure decision module 354 may switch the AE module 260 to the Digital Gain First mode of operation. When the average intensity of one of the IR images 332a-332m is lower than the average intensity of one of the RGB images 334a-334m (e.g., IR/RGB<threshold value), then the auto-exposure decision module 354 may switch the AE module 260 to the Shutter First mode of operation. The various factors that may be used to calibrate the predetermined threshold value may be varied according to the design criteria of a particular implementation.

The auto-exposure decision module 354 may switch between the Digital Gain First mode of operation and the Shutter First mode of operation as the IR interference measurement changes. By adjusting the mode of operation in real-time as the IR interference measurement changes, the AE module 260 may be configured to adapt to a changing lighting environment to ensure a consistent brightness of the output images of the various channels 306-310. The aggressiveness value provided by the signal AGGR may be used to by the auto-exposure decision module 354 to determine an amount of adjustment to the parameters in each mode of operation.

Figure 8:
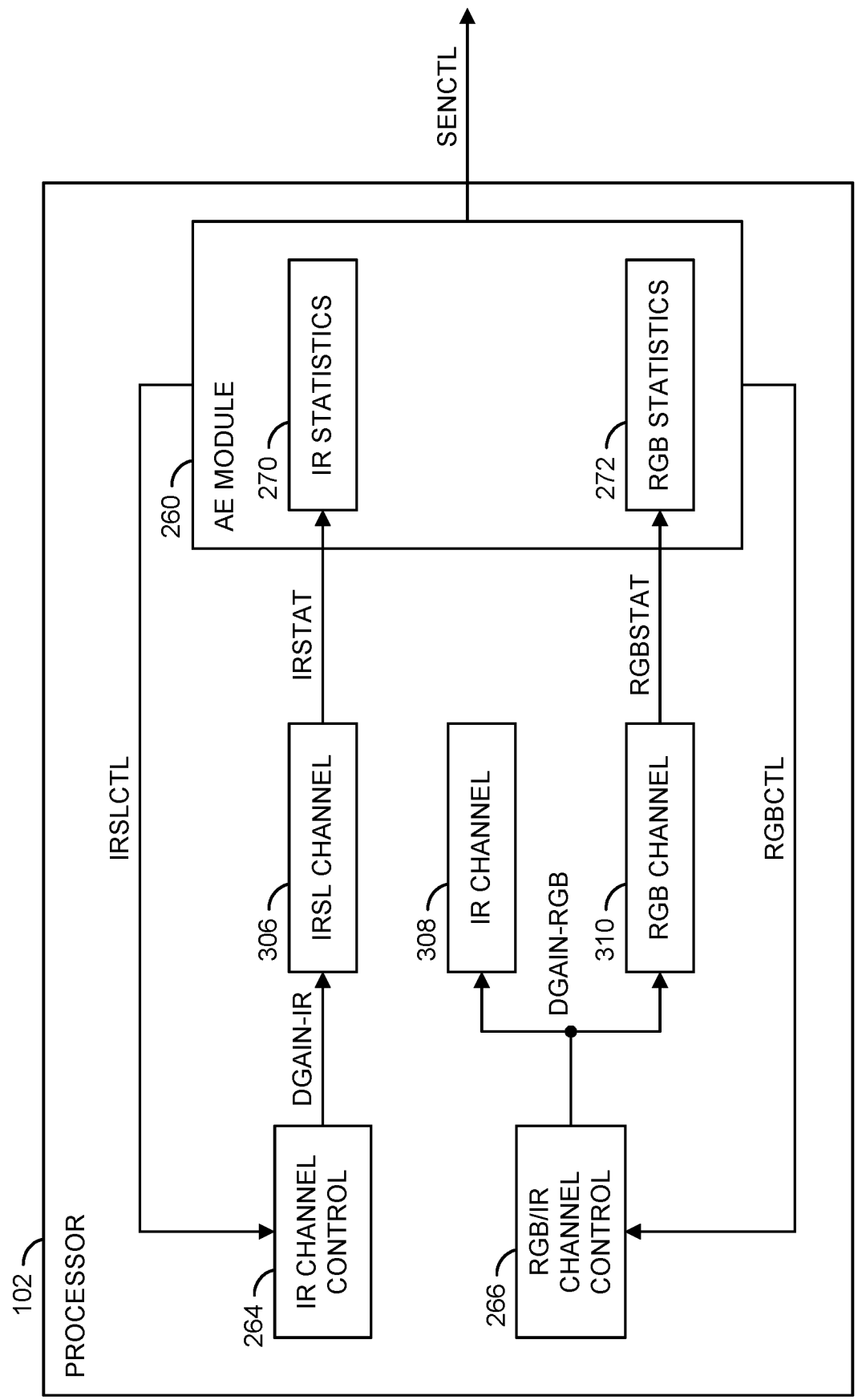
FIG. 8 is a block diagram illustrating adjusting an IR channel control and an RGB/IR channel control in response to statistics measured from video frames.

Referring to FIG. 8, a block diagram illustrating adjusting an IR channel control and an RGB/IR channel control in response to statistics measured from video frames is shown. The processor 102 with a portion of the components and/or modules of the processor 102 is shown. The AE module 260, the IR channel control logic 264, the RGB/IR channel control logic 266, the IRSL image channel 306, the IR image channel 308 and the RGB image channel 310 are shown. The AE module 260 may be configured to receive feedback data from the various channels 306-310. The feedback provided by the various channels 306-310 may be used by the AE module 260 in order to provide the adjustments for the sensor control logic 262, the IR channel control logic 264 and/or the RGB/IR channel control logic 266. The adjustments for the sensor control logic 262, the IR channel control logic 264 and/or the RGB/IR channel control logic 266 may affect the video frames 320a-320n dispatched in the various channels 306-310.

The processor 102 may be configured to execute computer readable instructions. In some embodiments, the computer readable instructions executed by the processor 102 may be stored in the memory 150. In an example, the computer readable instructions executed by the processor 102 may process the pixel data in the signal VIDEO arranged as video frames and extract the IR images with the structured light pattern 330a-330k, extract the IR images without the structured light pattern 332a-332m and extract the RGB images 334a-334m. In another example, the computer readable instructions executed by the processor 102 may generate the sensor control signal SENCTL in response to the IRSL images 330a-330k and the RGB images 334a-334m. In yet another example, the computer readable instructions executed by the processor 102 may calculate the IR interference measurement in response to the IR images 332a-332m and the RGB images 334a-334m and select a mode of operation (as shown in association with FIG. 7) for the IR channel control logic 264 and the RGB/IR channel control logic 266 in response to the IR interference measurement. The functionality of the processor 102 performed in response to executing the computer readable instructions may be varied according to the design criteria of a particular implementation.

The video frames 320a-320n generated by the processor 102 may be extracted by the IR extraction module 302 and/or the RGB extraction module 304 to provide the IRSL video frames 330a-330k with the dot pattern 322 for the IRSL image channel 306, the IR video frames 332a-332m without the dot pattern 322 for the IR image channel 308 and the RGB video frames 334a-334m for the RGB image channel 310. The IRSL image channel 306 may present a signal (e.g., IRSTAT) to the AE module 260. The signal IRSTAT may comprise statistics about the IRSL images 330a-330k generated by the IRSL image channel 306. The RGB image channel 310 may present a signal (e.g., RGBSTAT) to the AE module 260. The signal RGBSTAT may comprise statistics about the RGB images 334a-334m generated by the RGB image channel 310. The IR image channel 308 may be similarly capable of generating statistics about the IR images 332a-332m, but the statistics may not be used for the purposes of the AE module 260.

The IR statistics 270 may be configured to extract information about the IRSL images 330a-330k in response to the signal IRSTAT. The IR statistics 270 may be used by the AE module 260 to determine the various parameters to adjust for the sensor control logic 262, the IR channel control logic 264 and/or the RGB/IR channel control logic 266. The AE module 260 may be configured to generate the signal IRSLCTL in response to the data extracted by the IR statistics 270 and/or the mode of operation selected by the IR interference module 274.

The RGB statistics 272 may be configured to extract information about the RGB images 334a-334m in response to the signal RGBSTAT. The RGB statistics 272 may be used by the AE module 260 to determine the various parameters to adjust for the sensor control logic 262, the IR channel control logic 264 and/or the RGB/IR channel control logic 266. The AE module 260 may be configured to generate the signal RGBCTL in response to the data extracted by the RGB statistics 272 and/or the mode of operation selected by the IR interference module 274.

The IR statistics 270 and the RGB statistics 272 may comprise an analysis of the video frames 320a-320n generated in various lighting conditions. In one example, the statistics used and/or extracted by the IR statistics 270 and/or the RGB statistics 272 may comprise a sum of all luma values from all the pixels in one tile of the video frames 320a-320n. Each of the video frames 320a-320n (e.g., the IRSL video frames 330a-330k and the RGB video frames 334a-334m) may be divided into tiles having M columns and N rows, which may each provide a luma value. In another example, the statistics used and/or extracted by the IR statistics 270 and/or the RGB statistics 272 may comprise 64-bits of histogram data for each of the channels of the RGB-IR sensor 180 (e.g., the R-channel, the G-channel, the B-channel and the Luma channel). Each of the IRSL image channel 306, the IR image channel 308 and the RGB image channel 310 may have individual statistics data. The statistics data for the IRSL image channel 306, the IR image channel 308 and the RGB image channel 310 may comprise multiple entries of data such as a luma value sum, histograms, etc. Each of the channels 306-310 may use some (or all) of the statistics generated based on the particular use case and/or functionality. For the intelligent auto-exposure implemented by the AE module 260, the IR statistics 270 and the RGB statistics 272 may be used. The types of statistics about the video frames 320a-320n used by the AE module 260 may be varied according to the design criteria of a particular implementation.

In response to the IR statistics 270, the RGB statistics 272 and/or the mode of operation selected by the IR interference module 274, the AE module 260 may determine various sensor parameters and present the signal SENCTL to the sensor control logic 262 (not shown). In response to the IR statistics 270, the RGB statistics 272 and/or the mode of operation selected by the IR interference module 274, the AE module 260 may determine various IR parameters and present the signal IRSLCTL to the IR channel control logic 264. In response to the IR statistics 270, the RGB statistics 272 and/or the mode of operation selected by the IR interference module 274, the AE module 260 may determine various RGB parameters and present the signal RGBCTL to the RGB/IR channel control logic 266. The various parameters selected may enable the apparatus 100 to react in real time to changing light conditions to provide the intelligent auto-exposure control for RGB-IR sensor 180.

The IR channel control logic 264 may be configured to generate a signal (e.g., DGAIN-IR) in response to the signal IRSLCTL. The signal DGAIN-IR may comprise parameters that may be used by the IR channel control logic 264 to provide postprocessing adjustments. The signal DGAIN-IR may be provided to the IRSL image channel 306. The signal DGAIN-IR may be configured to adjust a brightness and/or a tone curve for the IRSL image frames 330a-330k in the IRSL image channel 306. The IRSL image channel 306 may continually provide the statistics about the IRSL image frames 330a-330k to the AE module 260 to enable real-time adjustments in response to feedback about the adjustments made by the IR channel control logic 264 (and the sensor control logic 262).

The RGB/IR channel control logic 266 may be configured to generate a signal (e.g., DGAIN-RGB) in response to the signal RGBCTL. The signal DGAIN-RGB may comprise parameters that may be used by the RGB/IR channel control logic 266 to provide postprocessing adjustments. The signal DGAIN-RGB may be provided to both the IR image channel 308 and the RGB image channel 310. Since both the IR image channel 308 and the RGB image channel 310 comprise pixel data from the video frames 320a-320n that were generated while the structured light pattern SLP was toggled off, similar adjustments may be applied to both the IR image channel 308 and the RGB image channel 310 The signal DGAIN-RGB may be configured to adjust a brightness and/or a tone curve for the IR image frames 332a-332m in the IR image channel 308 and the brightness and/or a tone curve for the RGB image frames 334a-334m in the RGB image channel 310. The RGB image channel 310 may continually provide the statistics about the RGB image frames 334a-334m to the AE module 260 to enable real-time adjustments in response to feedback about the adjustments made by the RGB/IR channel control logic 266 (and the sensor control logic 262).

The sensor control logic 262 may be adjusted in response to the sensor control signal SENCTL in order to automatically adjust an exposure for the RGB-IR sensor 180. Adjustments to the exposure for the RGB-IR sensor 180 may affect the performance (e.g., brightness) for each of the IRSL images 330a-330k, the IR images 332a-332m and the RGB images 334a-334m. The IR channel control logic 264 may be adjusted in response to the IR control signal IRSLCTL in order to automatically adjust an exposure for the IRSL images 330a-330k. The RGB/IR channel control logic 266 may be adjusted in response to the RGB control signal RGBCTL in order to automatically adjust an exposure for the IR images 332a-332m and the RGB images 334a-334m. The automatic adjustments performed by the AE module 260 may enable the RGB-IR sensor 180 to provide a consistent performance (e.g., generate video frames comprising both IR pixel data and RGB pixel data that may be adjusted to have consistent brightness) at various lighting conditions of visible light and infrared light.

Figure 9:
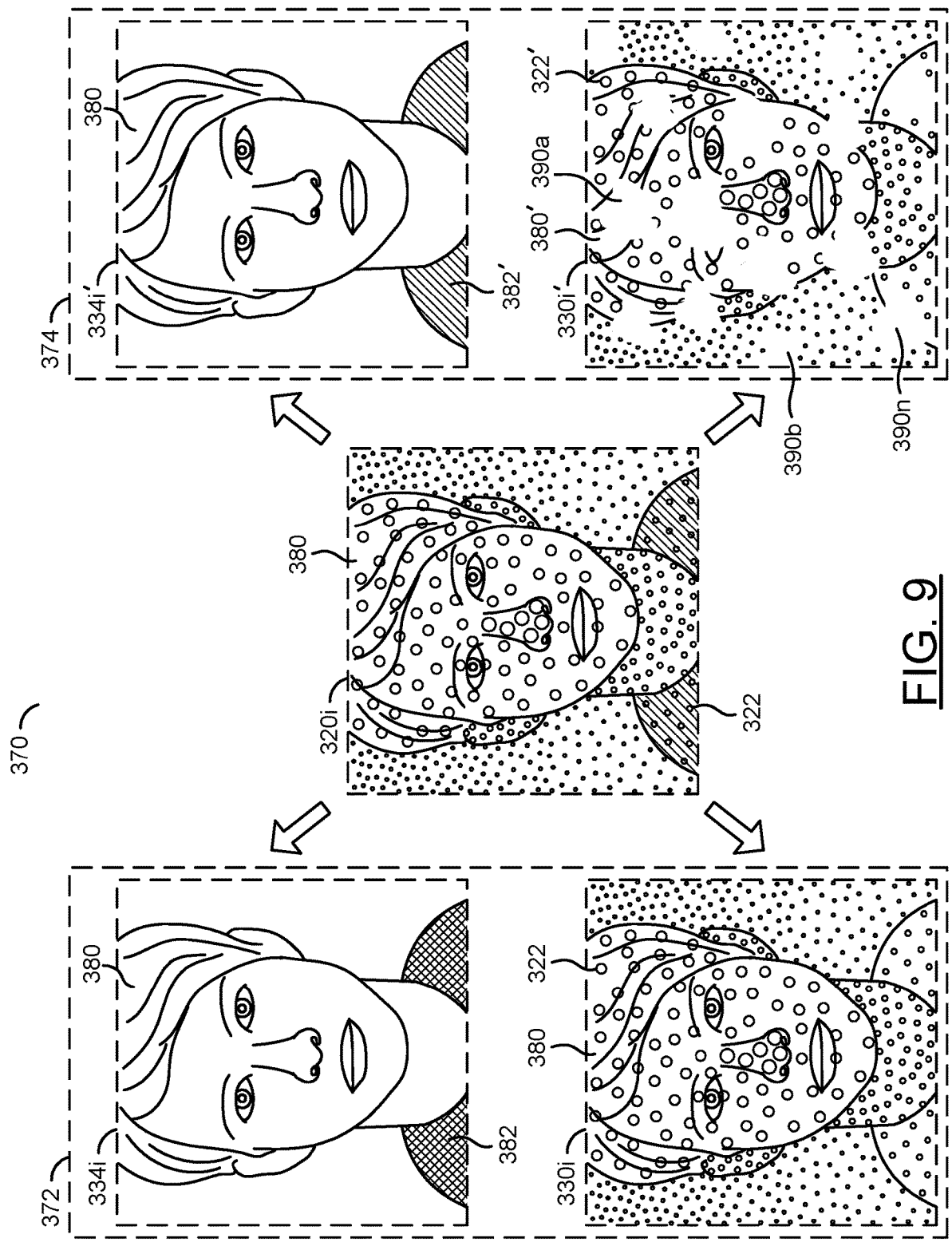
FIG. 9 is a diagram illustrating exposure results of video frames.

Referring to FIG. 9, a diagram illustrating exposure results of video frames is shown. Exposure results 370 are shown. The exposure results may comprise an input video frame 320i, intelligent auto-exposure output 372 and fixed auto-exposure output 374. The input video frame 320i may be a representative example of the input video frames 320a-320n. The intelligent auto-exposure output 372 may provide example output video frames (e.g., the signal VIDOUT) in response to implementing the apparatus 100 with the auto-exposure module 260, the sensor control logic 262, the IR channel control logic 264 and the RGB/IR channel control logic 266. The fixed auto-exposure output 374 may provide example output video frames in response to performing the auto-exposure without implementing the auto-exposure module 260, the sensor control logic 262, the IR channel control logic 264 and the RGB/IR channel control logic 266.

The video frame 320i is shown as a representative example of pixel data generated by the RGB-IR sensor 180 and arranged as a video frame. For illustrative purposes, the video frame 320i is shown as a single video frame. However, the video frames 320a-320n comprising the IR data with the structured light pattern SLP may have a different frame number than the video frames 320a-320n that comprise RGB data, as described in association with FIG. 6. Generally, multiple of the video frames 320a-320n may be dispatched using the IR extraction module 302 and the RGB extraction module 304 to generate the IRSL video frames 330a-330k and the RGB video frames 334a-334m.

The video frame 320i may comprise an image of a person 380. The video frame 320i may comprise the data input from the RGB-IR sensor 180. A face of the person 380 is shown in the video frame 320i. The dot pattern 322 is shown captured in the video frame 320i. The structured light pattern SLP may be projected onto the face of the person 380 as the pixel data for the video frame 320i is captured by the RGB-IR sensor 180. In one example, the pixel data of the face of the person 380 may be captured to provide input to the apparatus 100 in order to perform Face-Detection-Face-Recognition (FDFR). In another example, the pixel data of the face of the person 380 with the dot pattern 322 may be captured to provide input to the apparatus 100 in order to generate depth information for liveness detection and/or 3D reconstruction. The various features and/or functionality of the apparatus 100 performed in response to the video frames 320a-320n after the intelligent auto-exposure is performed may be varied according to the design criteria of a particular implementation.

The intelligent auto-exposure output 372 may comprise the RGB image 334i and the IRSL image 330i. The intelligent auto-exposure for the RGB image 334i and the IRSL image 330i may be performed partially based on the mode of operation selected and the parameters of the signal SENCTL selected for the sensor control logic 262. The RGB image 334i may be generated in response to the RGB extraction module 304 extracting the RGB pixel data from the video frame 320i (e.g., based on the timing of the structured light pattern SLP) and the RGB image channel 310 performing post-processing adjustments in response to the signal DGAIN-RGB selected by the RGB/IR channel control logic 266 in response to the mode of operation selected for the AE module 260. The IRSL image 330i may be generated in response to the IR extraction module 302 extracting the IRSL pixel data from the video frame 320i (e.g., a different frame number than the RGB image 334i based on the timing of the structured light pattern SLP) and the IRSL image channel 306 performing post-processing adjustments in response to the signal DGAIN-IR selected by the IR channel control logic 264 in response to the mode of operation selected for the AE module 260.

The RGB image 334i may comprise a color image of the person 380. The RGB image 334i may comprise colors 382. In the example shown, a shirt of the person 380 is shown shaded to indicate the colors 382. The dot pattern 322 is not shown in the RGB image 334i. The IRSL image 330i may comprise an infrared image of the person 380. The dot pattern 322 may be shown in the IRSL image 330i.

The fixed auto-exposure output 374 may comprise the RGB image 334i' and the IRSL image 330i'. The auto-exposure for the RGB image 334i' and the IRSL image 330i' may be performed without the AE module 260, the sensor control logic 262, the IR channel control logic 264 or the RGB/IR channel control logic 266. The RGB image 334i' may comprise a color image of the person 380. The RGB image 334i' may comprise colors 382'. In the example shown, a shirt of the person 380 is shown shaded to indicate the colors 382'. The dot pattern 322 is not shown in the RGB image 334i'. The IRSL image 330i' may comprise an infrared image of the person 380'. The dot pattern 322' may be shown in the IRSL image 330i'.

For the intelligent auto-exposure output 372, the RGB images 334a-334m may be well exposed and the colors 382 may be correct (e.g., accurately represented). Similarly, for the fixed auto-exposure output 374, the RGB images 334a'-334m' may be well exposed and the colors 382' may be correct. Both the RGB images 334a-334m of the intelligent auto-exposure output 372 and the RGB images 334a'-334m' of the fixed auto-exposure output 374 may be suitable input for the Face-Detection-Face-Recognition and/or other object detection operations that may be performed by the processor 102 and/or the CNN module 190b. In the example shown, the colors 382 of the RGB image 334i may be slightly darker than the colors 382' of the RGB image 334i' (or have more noise due to analog gain control (AGC)). However, the minor differences in the colors 382 of the RGB image 334i and the colors 382' of the RGB image 334i' may not be significant enough to have an impact on the FDFR and/or other computer vision operations performed by the processor 102.

The IRSL image 330i may be a monochrome image with the dot pattern 322. The IRSL image 330i' may be a monochrome image with the dot pattern 322'. The IRSL image 330i may be well exposed and all of the structured light pattern SLP may be captured in the dot pattern 322. With the intelligent AE control implemented by the apparatus 100, the IRSL images 330a-330k may be well exposed for the depth information and may be used by the processor 102 for liveness detection.

The IRSL image 330i' is shown with overexposed areas 390a-390n. The overexposed areas 390a-390n may not have details (e.g., portions of the face of the person 380' may be missing) and portions of the dot pattern 322' may be missing (e.g., the structured light pattern SLP may not be fully captured). Due to the overexposed areas 390a-390n, the IRSL images 330a'-330k' of the fixed auto-exposure output 374 may not provide sufficient information for the processor 102 to generate depth information and/or perform liveness detection.

In some embodiments, the fixed auto-exposure output 374 may be adjusted to prevent the overexposed areas 390a-390n in the IRSL images 330a'-330k'. However, when using the fixed auto-exposure, correcting the overexposed areas 390a-390n may sacrifice the brightness of the RGB images 334a'-334m', which may affect the FDFR and/or other computer vision operations. The fixed auto-exposure output 374 may comprise a tradeoff between accurately generated RGB images and accurately generated IRSL images.

The intelligent auto-exposure output 372 may enable the well exposed RGB images 334a-334m to be generated simultaneously with the well exposed IRSL images 330a-330k (or near simultaneously based on the particular frame numbers dispatched to the various image channels 306-310). The AE module 260, the sensor control logic 262, the IR channel control logic 264 and the RGB/IR channel control logic 266 operating based on the mode of operation selected, may enable both the RGB images 334a-334m and the IRSL images 330a-330k to be generated without a tradeoff in accuracy and/or brightness between the RGB images 334a-334m and the IRSL images 330a-330k. Using the intelligent auto-exposure for the RGB-IR sensor 180, the apparatus 100 may provide output that may be suitable for both FDFR and/or other computer vision operations as well as generating the depth information and/or performing the liveness detection.

Figure 10:
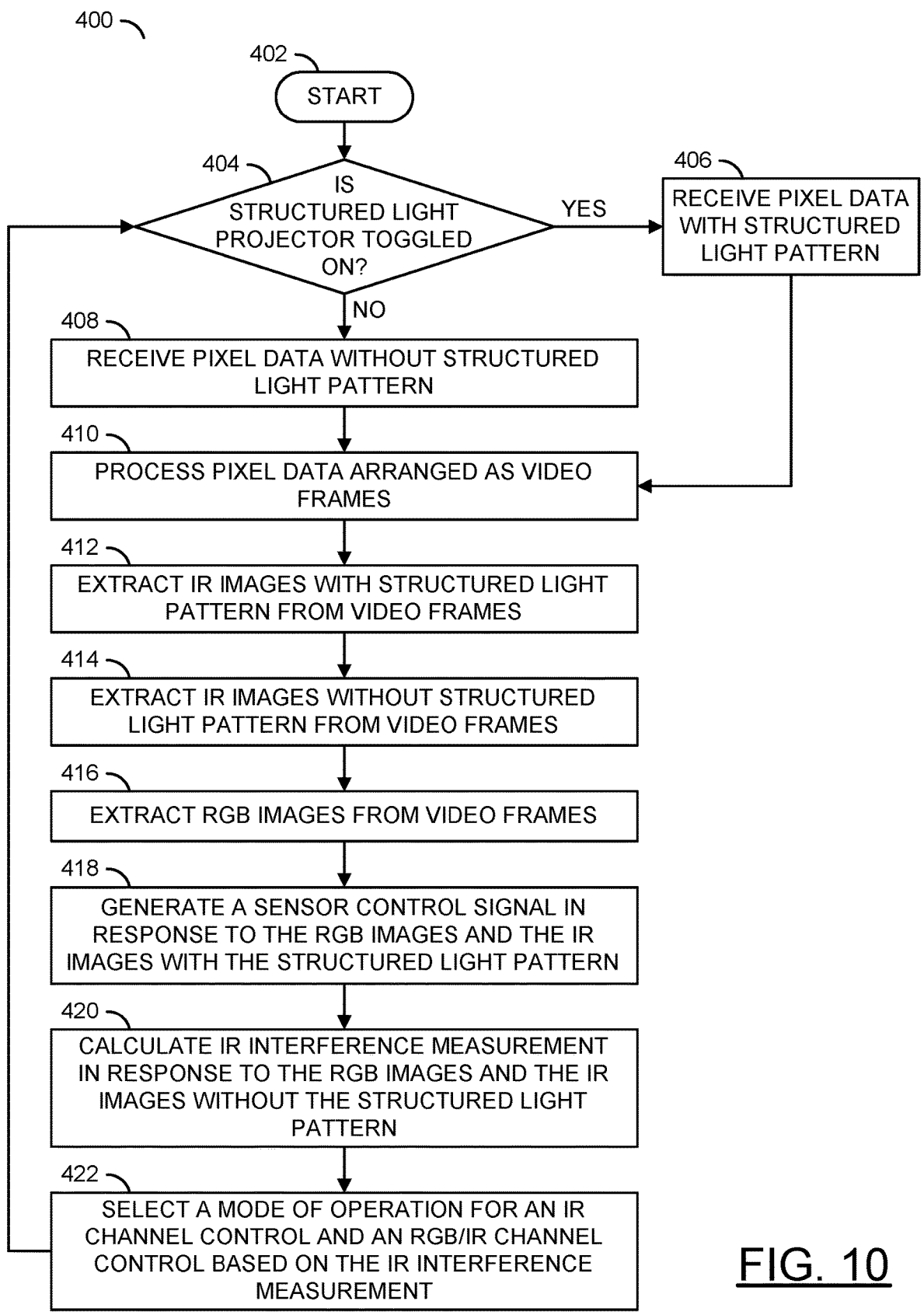
FIG. 10 is a flow diagram illustrating a method for performing intelligent auto-exposure control for an RGB-IR sensor.

Referring to FIG. 10, a method (or process) 400 is shown. The method 400 may perform intelligent auto-exposure control for an RGB-IR sensor. The method 400 generally comprises a step (or state) 402, a decision step (or state) 404, a step (or state) 406, a step (or state) 408, a step (or state) 410, a step (or state) 412, a step (or state) 414, a step (or state) 416, a step (or state) 418, a step (or state) 420, and a step (or state) 422.

The step 402 may start the method 400. Next, the method 400 may move to the decision step 404. In the decision step 404, the processor 102 may determine whether the structured light projector 106 is toggled on. In an example, the processor 102 may toggle the structured light pattern SLP on or off based on the timing signal SL_TRIG. If the structured light pattern SLP is toggled on, then the method 400 may move to the step 406. In the step 406, the RGB-IR sensor 180 may generate pixel data with the structured light pattern SLP exposed and the pixel data with the structured light pattern SLP may be received by the processor 102. Next, the method 400 may move to the step 410. In the decision step 404, if the structured light pattern SLP is toggled off, then the method 400 may move to the step 408. In the step 408, the RGB-IR sensor 180 may generate pixel data without the structured light pattern SLP and the pixel data may be received by the processor 102. Next, the method 400 may move to the step 410.

In the step 410, the processor 102 may process the pixel data arranged as the video frames 320a-320n. Next, the method 400 may perform extraction steps 412-416. While the extraction steps 412-416 are shown sequentially, the extraction of the video frames into the various channels 306-310 may be performed by the processor 102 in parallel. In the step 412, the IR extraction module 302 may extract the IRSL video frames 330a-330k with the dot pattern 322 to the IRSL image channel 306. In the step 414, the IR extraction module 302 may extract the IR video frames 332a-332m without the dot pattern 322 to the IR image channel 308. In the step 416, the RGB extraction module 304 may extract the RGB video frames 334a-334m to the RGB image channel 310. After the various extractions are performed, the method 400 may move to the step 418.

In the step 418, the AE module 260 may generate the sensor control signal SENCTL in response to the RGB statistics 272 of the RGB images 334a-334m and the IR statistics 270 of the IRSL images 330a-330k. Next, in the step 420, the IR interference module 274 may calculate the IR interference measurement in response to the RGB images 334a-334m and the IR images 332a-332m. For example, the average intensity may be calculated by the average intensity module 352. In the step 422, the IR interference module 274 may select a mode of operation (e.g., the Shutter First mode of operation or the Digital Gain First mode of operation) by generating either the signal SF or the signal DGF. The mode of operation may be selected for the sensor control logic 262, the IR channel control logic 264 and the RGB/IR channel control logic 266 based on the IR measurement performed. Next, the method 400 may return to the decision step 404 (e.g., generate more video frames and perform the intelligent auto-exposure based on the incoming input pixel data).

Figure 11:
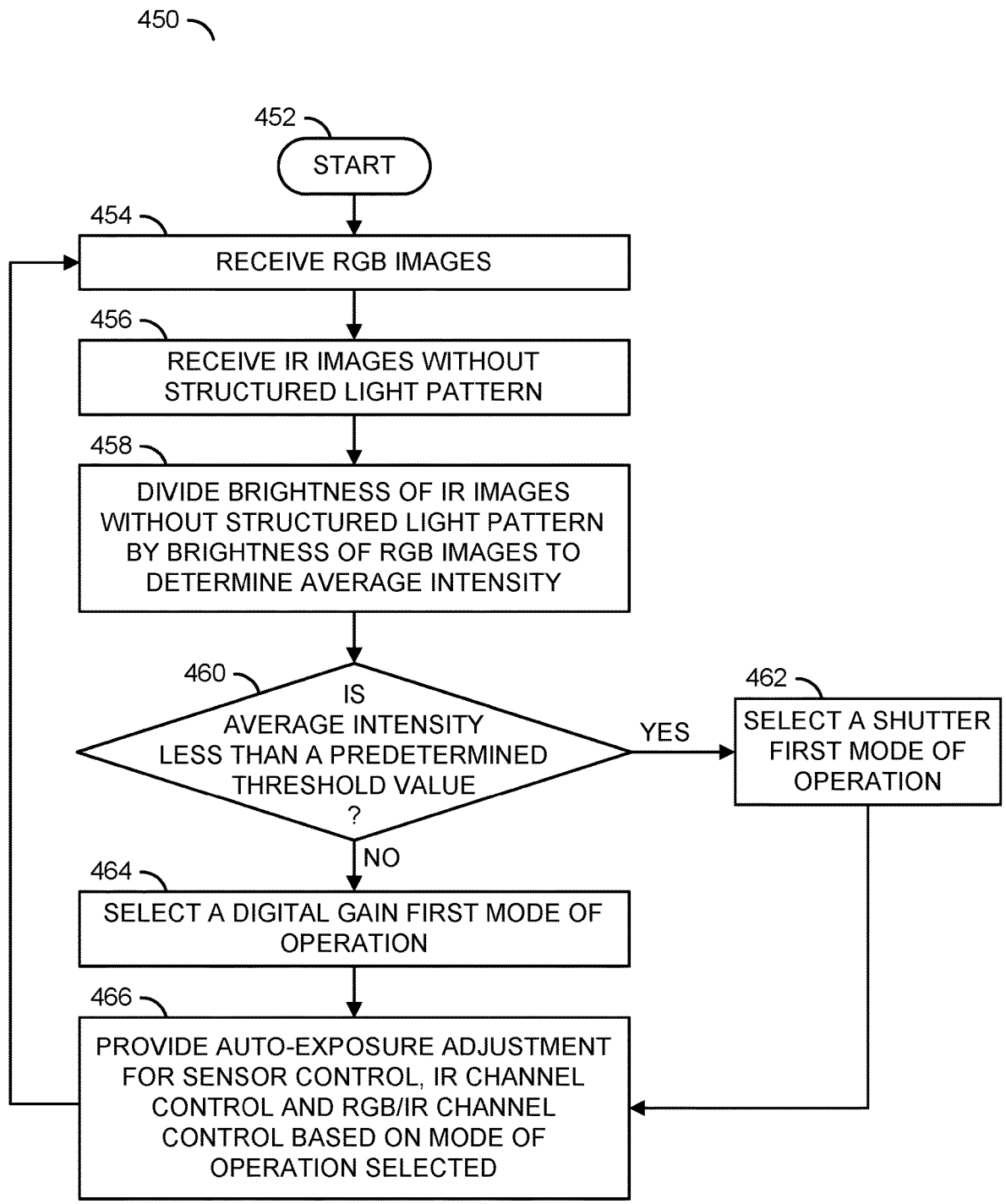
FIG. 11 is a flow diagram illustrating a method for performing an IR interference measurement.

Referring to FIG. 11, a method (or process) 450 is shown. The method 450 may perform an IR interference measurement. The method 450 generally comprises a step (or state) 452, a step (or state) 454, a step (or state) 456, a step (or state) 458, a decision step (or state) 460, a step (or state) 462, a step (or state) 464, and a step (or state) 466.

The step 452 may start the method 450. In the step 454, the IR interference module 274 may receive the RGB images 334a-334m, which may be presented to the average intensity module 352. In the step 456, the IR interference module 274 may receive the IR images 332a-332m (without the dot pattern 322), which may be presented to the average intensity module 352. While the step 454 and the step 456 are shown sequentially, the IR interference module 274 may receive the pixel data in the steps 454-456 simultaneously. Next, in the step 458, the average intensity module 352 may divide a brightness of the IR images 332a-332m by the brightness of the RGB images 334a-334m to determine the average intensity. The average intensity may be presented via the signal AVGINT to the auto-exposure decision module 354. Next, the method 450 may move to the decision step 460.

In the decision step 460, the auto-exposure decision module 354 may determine whether the average intensity calculated is less than a predetermined threshold value. In an example, the AE decision module 354 may compare the average intensity in the signal AVGINT to the predetermined threshold value. If the average intensity is less than the predetermined threshold value, then the method 450 may move to the step 462. In the step 462, the AE decision module 354 may select the Shutter First mode of operation. For example, the AE decision module 354 may provide the signal SF. Next, the method 450 may move to the step 466. In the decision step 460, if the average intensity is greater than or equal to the predetermined threshold value, then the method 450 may move to the step 464. In the step 464, the AE decision module 354 may select the Digital Gain First mode of operation. For example, the AE decision module 354 may provide the signal DGF. Next, the method 450 may move to the step 466.

In the step 466, the AE module 260 may provide an auto-exposure adjustment for the sensor control logic 262 (e.g., the signal SENCTL), the IR channel control logic 264 (e.g., the signal IRSLCTL) and the RGB/IR channel control logic 266 (e.g., the signal RGBCTL) based on the mode of operation selected. Next, the method 450 may return to the step 454. The method 450 may continually measure the IR interference based on the average intensity of the RGB images 334a-334m and the IR images 332a-332m to dynamically adjust the mode of operation appropriate for the environment.

Figure 12:
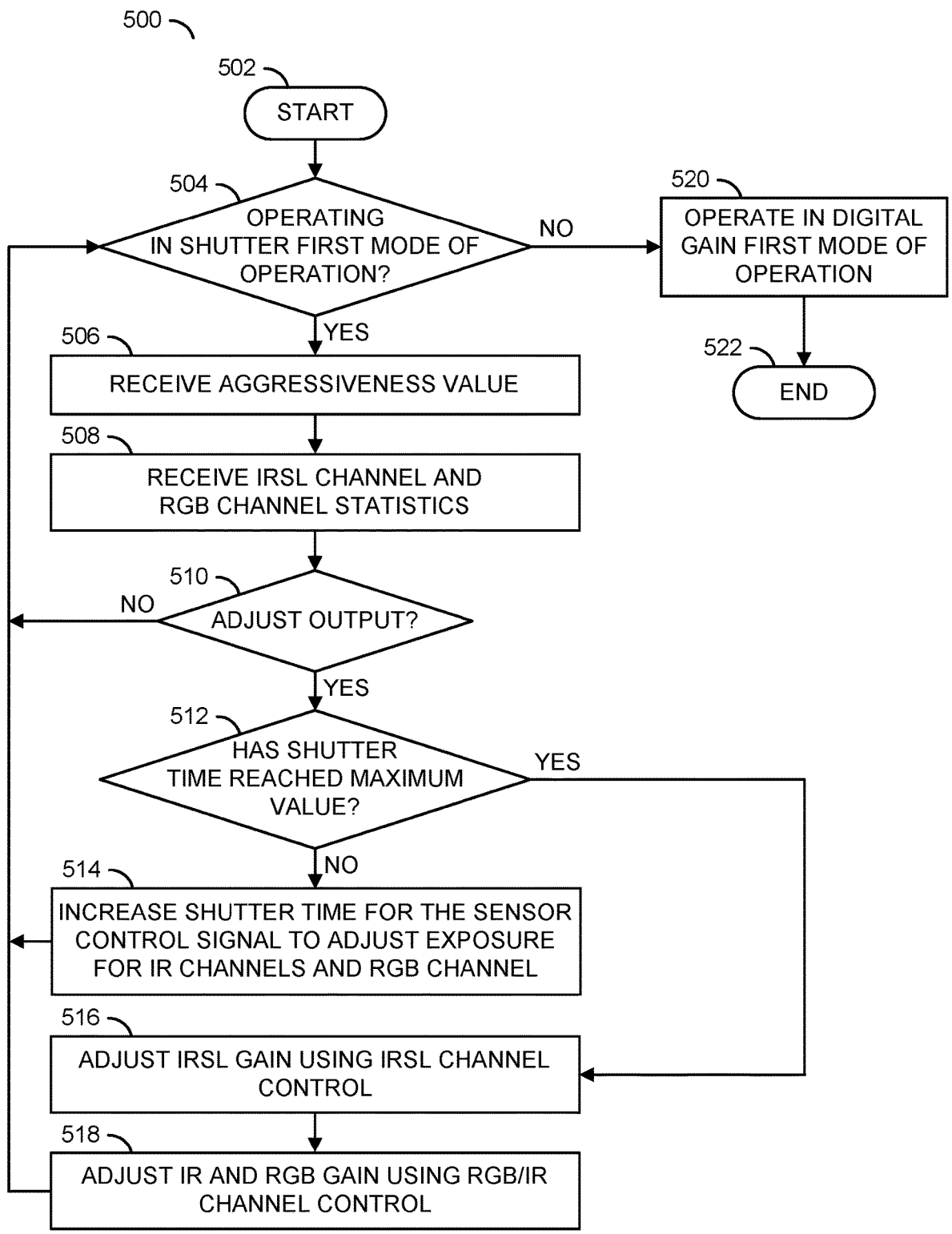
FIG. 12 is a flow diagram illustrating a method for auto-exposure control in a shutter first mode of operation.

Referring to FIG. 12, a method (or process) 500 is shown. The method 500 may implement auto-exposure control in a shutter first mode of operation. The method 500 generally comprises a step (or state) 502, a decision step (or state) 504, a step (or state) 506, a step (or state) 508, a decision step (or state) 510, a decision step (or state) 512, a step (or state) 514, a step (or state) 516, a step (or state) 518, a step (or state) 520, and a step (or state) 522.

The step 502 may start the method 500. Next, the method 500 may move to the decision step 504. In the decision step 504, the AE module 260 may determine whether the AE decision module 354 has selected the Shutter First mode of operation. For example, the Shutter First mode of operation may be selected in response to the signal SF. If the AE module 260 is operating in the Shutter First mode of operation, then the method 500 may move to the step 506. In the step 506, the AE module 260 may receive the aggressiveness value AGGR. Next, in the step 508, the AE module 260 may receive statistics. The AE module 260 may receive the statistics from the IRSL image channel 306 and the RGB image channel 310 in parallel. The AE module 260 may receive the IR statistics 270 from the IRSL image channel 306 via the signal IRSTAT and the RGB statistics 272 from the RGB image channel 310 via the signal RGB-STAT. Next, the method 500 may move to the decision step 510.

In the decision step 510, the AE module 260 may determine whether the output should be adjusted. In an example, the output may be adjusted in order to achieve the consistent brightness. The AE module 260 may analyze the IR statistics 270, the RGB statistics 272 and/or the aggressiveness value AGGR to determine whether to adjust the output. If adjustment to the output would not be beneficial to performance, then the method 500 may return to the decision step 504. If adjusting the output may be beneficial to performance, then the method 500 may move to the decision step 512.

In the decision step 512, the AE module 260 may determine whether the shutter time has reached the maximum value. In an example, the memory 150 and/or feedback may track the current shutter time and/or the maximum shutter time value. If the shutter time has not been increased to the maximum value, then the method 500 may move to the step 514. In the step 514, the AE module 260 may increase the shutter time for the sensor control signal SENCTL in order to adjust an exposure for the video frames extracted in each of the IRSL image channel 306, the IR image channel 308 and the RGB image channel 310. Next, the method 500 may return to the decision step 504.

In the decision step 512, if the shutter time has been increased to the maximum value, then the method 500 may move to the step 516. In the step 516, the AE module 260 may generate the signal IRSLCTL for the IR channel control logic 264 to perform post-processing for the IRSL images 330a-330k in the IRSL image channel 306. For example, the IR channel control logic 264 may control a gain of the IRSL images 330a-330k via the signal DGAIN-IR. Next, in the step 518, the AE module 260 may generate the signal RGBCTL for the RGB/IR channel control logic 266 to perform post-processing for the IR images 332a-332m in the IR image channel 308 and the RGB images 334a-334m in the RGB image channel 310. For example, the RGB/IR channel control logic 266 may control a gain for the IR images 332a-332m and the RGB images 334a-334m via the signal DGAIN-RGB. For example, once the shutter time reaches the maximum value, digital gain and/or tone mapping may be performed for further adjustments. While the steps 516-518 are shown sequentially, the adjustments in the steps 516-518 may be performed in parallel. Next, the method 500 may return to the decision step 504.

In the decision step 504, if the AE module 260 is not operating in the Shutter First mode of operation, then the method 500 may move to the step 550. In the step 550, the AE module 260 may operate in the Digital Gain First mode of operation (to be described in association with FIG. 13). Next, the method 500 may move to the step 522. The step 522 may end the method 500.

Figure 13:
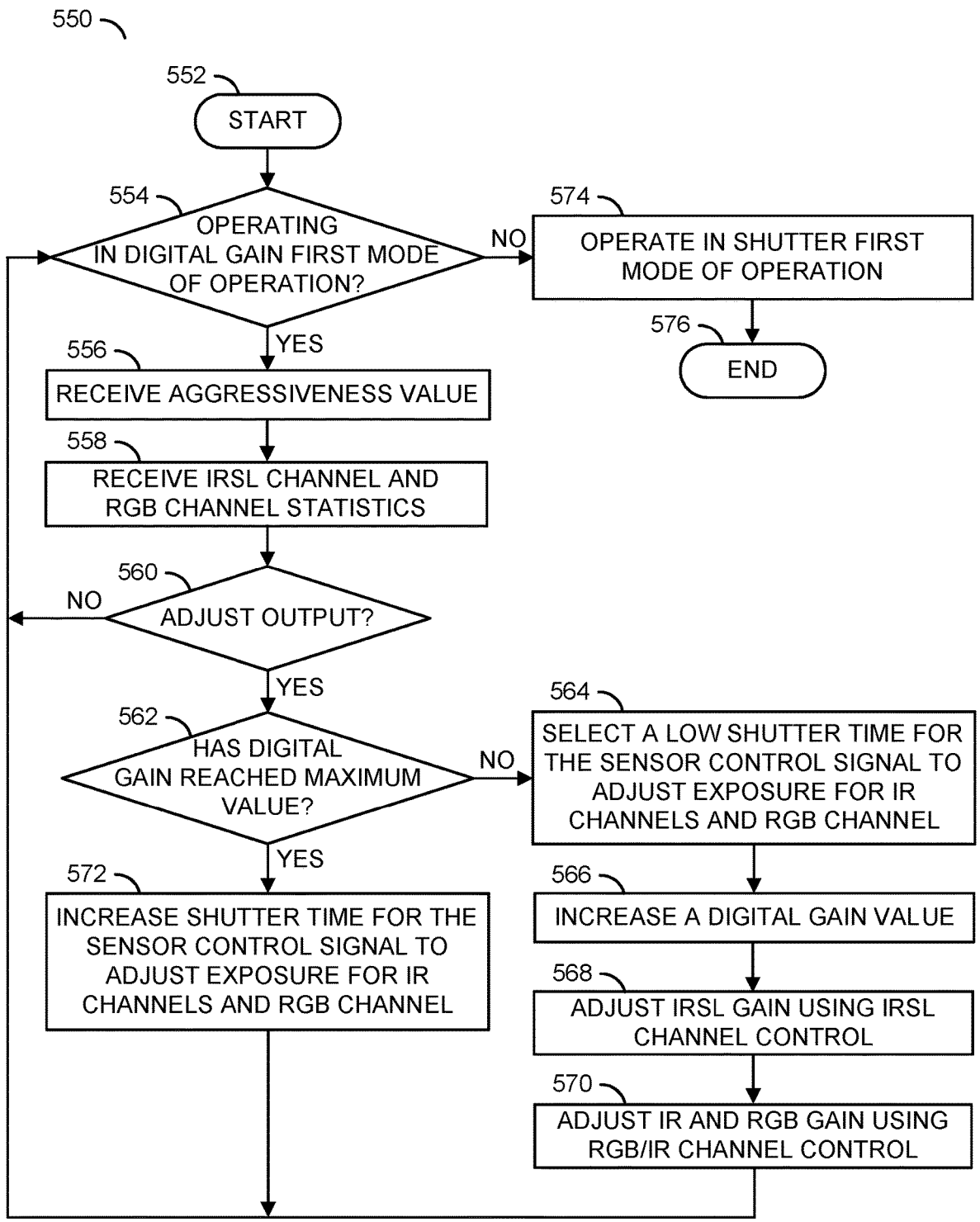
FIG. 13 is a flow diagram illustrating a method for auto-exposure control in a digital gain first mode of operation.

Referring to FIG. 13, a method (or process) 550 is shown. The method 550 may implement auto-exposure control in a digital gain first mode of operation. The method 550 generally comprises a step (or state) 552, a decision step (or state) 554, a step (or state) 556, a step (or state) 558, a decision step (or state) 560, a decision step (or state) 562, a step (or state) 564, a step (or state) 566, a step (or state) 568, a step (or state) 570, a step (or state) 572, a step (or state) 574, and a step (or state) 576.

The step 552 may start the method 550. Next, the method 550 may move to the decision step 554. In the decision step 554, the AE module 260 may determine whether the AE decision module 354 has selected the Digital Gain First mode of operation. For example, the Digital Gain First mode of operation may be selected in response to the signal DGF. If the AE module 260 is operating in the Digital Gain First mode of operation, then the method 550 may move to the step 556. In the step 556, the AE module 260 may receive the aggressiveness value AGGR. Next, in the step 558, the AE module 260 may receive statistics. The AE module 260 may receive the statistics from the IRSL image channel 306 and the RGB image channel 310 in parallel. The AE module 260 may receive the IR statistics 270 from the IRSL image channel 306 via the signal IRSTAT and the RGB statistics 272 from the RGB image channel 310 via the signal RGB-STAT. Next, the method 550 may move to the decision step 560.

In the decision step 560, the AE module 260 may determine whether the output should be adjusted. In an example, the output may be adjusted in order to achieve the consistent brightness. The AE module 260 may analyze the IR statistics 270, the RGB statistics 272 and/or the aggressiveness value AGGR to determine whether to adjust the output. If adjustment to the output would not be beneficial to performance, then the method 550 may return to the decision step 554. If adjusting the output may be beneficial to performance, then the method 550 may move to the decision step 562.

In the decision step 562, the AE module 260 may determine whether the digital gain has reached the maximum value. In an example, the memory 150 and/or feedback may track the current digital gain and/or the maximum digital gain value. If the digital gain has not been increased to the maximum value, then the method 550 may move to the step 564. In the step 564, the AE module 260 may select a low shutter time for the sensor control signal SENCTL in order to adjust an exposure for the video frames extracted in each of the IRSL image channel 306, the IR image channel 308 and the RGB image channel 310. Next, in the step 566, AE module 260 may increase a digital gain value for the IR channel control logic 264 and the RGB/IR channel control logic 266. In the step 568, the AE module 260 may generate the signal IRSLCTL for the IR channel control logic 264 to perform post-processing for the IRSL images 330a-330k in the IRSL image channel 306. For example, the IR channel control logic 264 may control a gain of the IRSL images 330a-330k via the signal DGAIN-IR. In the step 570, the AE module 260 may generate the signal RGBCTL for the RGB/IR channel control logic 266 to perform post-processing for the IR images 332a-332m in the IR image channel 308 and the RGB images 334a-334m in the RGB image channel 310. For example, the RGB/IR channel control logic 266 may control a gain for the IR images 332a-332m and the RGB images 334a-334m via the signal DGAIN-RGB. Next, the method 550 may return to the decision step 554.

In the decision step 562, if the digital gain has been increased to the maximum value, then the method 550 may move to the step 572. In the step 572, the AE module 260 may increase the shutter time for the sensor control signal SENCTL in order to adjust an exposure for the video frames extracted in each of the IRSL image channel 306, the IR image channel 308 and the RGB image channel 310. Next, the method 550 may return to the decision step 554.

In the decision step 554, if the AE module 260 is not operating in the Digital Gain First mode of operation, the method 550 may move to the step 574. In the step 574, the AE module 260 may operate in the Shutter First mode of operation (as described in association with FIG. 12). Next, the method 550 may move to the step 574. The step 574 may end the method 550.

The functions performed by the diagrams of FIGS. 1-13 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
   a structured light projector configured to toggle a structured light pattern in response to a timing signal;
   an image sensor configured to generate pixel data; and
   a processor configured to (i) process said pixel data arranged as video frames, (ii) extract (a) IR images with said structured light pattern, (b) IR images without said structured light pattern and (c) RGB images from said video frames, (iii) generate a sensor control signal in response to said IR images with said structured light pattern and said RGB images, (iv) calculate an IR interference measurement in response to said IR images without said structured light pattern and said RGB images and (v) select a mode of operation for an IR channel control and an RGB/IR channel control in response to said IR interference measurement, wherein
   (a) said sensor control signal is configured to adjust an exposure for said image sensor for both said IR images with said structured light pattern and said RGB images,
   (b) said IR channel control is configured to adjust said exposure for said IR images with said structured light pattern, and
   (c) said RGB/IR channel control is configured to adjust said exposure for said RGB images and said IR images without said structured light pattern.

2. The apparatus according to claim 1, wherein said mode of operation comprises either a digital gain first mode of operation or a shutter first mode of operation.

3. The apparatus according to claim 2, wherein said digital gain first mode of operation selects a low shutter time based on an aggressiveness value and increases a digital gain value.

4. The apparatus according to claim 3, wherein in said digital gain first mode of operation (i) said IR channel control is configured to expose said structured light pattern for said IR images with said structured light pattern and said RGB/IR channel control is configured to adjust digital gain and a tone curve to increase brightness and (ii) said low shutter time is increased after said digital gain reaches a maximum value.

5. The apparatus according to claim 2, wherein said shutter first mode of operation (i) selects a high shutter time based on an aggressiveness value to increase brightness and expose said structured light pattern and (ii) adjusts digital gain and tone curve after said high shutter time reaches a maximum value.

6. The apparatus according to claim 2, wherein (i) said processor is configured to receive an aggressiveness value and (ii) said aggressiveness value is a user input configured to select a division or a ratio for an amount of shutter adjustment and a digital gain value for both said digital gain first mode of operation and said shutter first mode of operation.

7. The apparatus according to claim 1, wherein said processor is configured to enable said image sensor to provide consistent brightness at various light conditions of visible light and infrared light.

8. The apparatus according to claim 1, wherein said IR interference measurement comprises (i) determining an average intensity based on both (a) one of said IR images without said structured light pattern and (b) one of said RGB images and (ii) comparing said average intensity to a predetermined threshold value.

9. The apparatus according to claim 8, wherein said average intensity is determined in response to (i) determining an intensity of one of said IR images without said structured light pattern, (ii) determining an intensity of one of said RGB images and (iii) dividing said intensity of said one of said IR images without said structured light pattern by said intensity of said one of said RGB images.

10. The apparatus according to claim 8, wherein said predetermined threshold value is determined based on (i) an energy intensity, a maximum duty cycle and a maximum time duration of said structured light projector, (ii) a sensitivity of an RGB/IR channel of said image sensor and (iii) a sensitivity of an IR channel of said image sensor.

11. The apparatus according to claim 8, wherein said processor selects (i) a Digital Gain First mode of operation when said average intensity is greater than or equal to said predetermined threshold value and (ii) a Shutter First mode of operation when said average intensity is less than said predetermined threshold value.

12. The apparatus according to claim 1, wherein said apparatus is configured to provide an auto-exposure adjustment for said image sensor.

13. The apparatus according to claim 1, wherein said image sensor is an RGB-IR sensor configured to generate said pixel data for said IR images with said structured light pattern, said IR images without said structured light pattern and said RGB images at the same time.

14. The apparatus according to claim 1, wherein said sensor control signal is configured to adjust said exposure for said image sensor by controlling a shutter value to control an aperture for a capture device and an exposure time and a gain value for said image sensor.

15. The apparatus according to claim 1, wherein said processor is further configured to (i) determine IR statistics in response to said IR images with said structured light pattern and RGB statistics in response to said RGB images and (ii) generate said sensor control signal in response to said IR statistics and said RGB statistics.

16. The apparatus according to claim 15, wherein said IR statistics comprise a sum of luma values from all pixels in one tile of said IR images with said structured light pattern and a histogram for each channel of said IR images with said structured light pattern.

17. The apparatus according to claim 15, wherein said RGB statistics comprise a sum of luma values from all pixels in one tile of said RGB images and a histogram for each channel of said RGB images.

18. The apparatus according to claim 1, wherein said sensor control signal adjusts said exposure for said image sensor by adjusting an amount of light that reaches said image sensor.

19. The apparatus according to claim 1, wherein said exposure for said IR images with said structured light pattern and said exposure for said RGB images and said IR images without said structured light pattern comprise a post-processing technique performed by said processor.

20. The apparatus according to claim 1, wherein said processor is configured to provide an auto-exposure adjustment to (i) adjust said exposure for said IR images with said structured light pattern to prevent an over-exposure that causes missing details to ensure sufficient depth information for liveness detection and (ii) adjust said exposure for said RGB images ensure correct colors for face detection and face recognition (FDFR).

* * * * *